US012578669B2

(12) United States Patent
Tsuru et al.

(10) Patent No.: US 12,578,669 B2
(45) Date of Patent: Mar. 17, 2026

(54) DEVELOPER FEED ROLLER, DEVELOPING APPARATUS, ELECTROPHOTOGRAPHIC IMAGE FORMING APPARATUS, AND PROCESS CARTRIDGE

(71) Applicant: CANON KABUSHIKI KAISHA, Tokyo (JP)

(72) Inventors: Seiji Tsuru, Shizuoka (JP); Hiroaki Komatsu, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/802,667

(22) Filed: Aug. 13, 2024

(65) Prior Publication Data

US 2025/0068094 A1 Feb. 27, 2025

(30) Foreign Application Priority Data

Aug. 23, 2023 (JP) ................................ 2023-135887

(51) Int. Cl.

| | |
|---|---|
| ***G03G 15/08*** | (2006.01) |
| ***G03G 15/06*** | (2006.01) |
| ***G03G 21/18*** | (2006.01) |

(52) U.S. Cl.

CPC ....... *G03G 15/0808* (2013.01); *G03G 15/065* (2013.01); *G03G 15/087* (2013.01); *G03G 21/1814* (2013.01)

(58) Field of Classification Search

None

See application file for complete search history.

(56) References Cited

U.S. PATENT DOCUMENTS

| | | | |
|---|---|---|---|
| 8,298,670 | B2 | 10/2012 | Muranaka et al. |
| 8,449,975 | B2 | 5/2013 | Hirakoso et al. |
| 9,023,465 | B2 | 5/2015 | Yamada et al. |
| 9,625,854 | B2 | 4/2017 | Koyanagi et al. |

(Continued)

FOREIGN PATENT DOCUMENTS

| | | | | |
|---|---|---|---|---|
| CA | 3218892 A1 | 11/2022 | | |
| DE | 102011081113 B3 * | 1/2010 | ............ | G03G 15/10 |

(Continued)

OTHER PUBLICATIONS

U.S. Appl. No. 18/802,696, Ryosuke Takayama, filed Aug. 13, 2024.

*Primary Examiner* — Sevan A Aydin
(74) *Attorney, Agent, or Firm* — VENABLE LLP

(57) ABSTRACT

An electrophotographic roller comprising a substrate having a conductive surface and a conductive layer on the surface of the substrate, wherein the conductive layer is a surface layer of the electrophotographic roller, and has a skeleton comprising polyurethane and an electron conductive filler in the polyurethane, the conductive layer comprises at least one void, and at least a part of an inner wall of the void is configured of the skeleton, and when an electrode is brought into contact with an outer surface of the conductive layer and an AC voltage with an inter-peak voltage of 50 V is applied between the electrode and the surface of the substrate in a frequency range of 0.1 to 10 Hz, an absolute value of a phase delay θ of an AC impedance with respect to the AC voltage is 10 degrees or less.

15 Claims, 8 Drawing Sheets

(56) References Cited

U.S. PATENT DOCUMENTS

| | | | |
|---|---|---|---|
| 9,811,021 | B2 | 11/2017 | Muranaka et al. |
| 10,635,019 | B2 | 4/2020 | Doi et al. |
| 10,678,161 | B2 | 6/2020 | Tsuru et al. |
| 10,884,352 | B2 | 1/2021 | Yamada et al. |
| 10,969,709 | B2 | 4/2021 | Arimura et al. |
| 10,996,581 | B2 | 5/2021 | Muranaka et al. |
| 11,022,904 | B2 | 6/2021 | Arimura et al. |
| 11,112,718 | B2 | 9/2021 | Uno et al. |
| 11,169,464 | B2 | 11/2021 | Komatsu et al. |
| 11,971,668 | B2 | 4/2024 | Takayama et al. |
| 2001/0026708 | A1 | 10/2001 | Ishii et al. |
| 2006/0142131 | A1* | 6/2006 | Iwamura ............... B05C 1/0808 73/104 |
| 2007/0230975 | A1* | 10/2007 | Yamazaki .......... G03G 15/0233 399/31 |
| 2011/0048324 | A1* | 3/2011 | Yamashita ................. B41J 2/01 118/620 |
| 2012/0193583 | A1 | 8/2012 | Roetker et al. |
| 2014/0064792 | A1* | 3/2014 | Kawamura .......... G03G 9/0821 399/286 |
| 2014/0199098 | A1* | 7/2014 | Abe ................... G03G 15/0808 399/286 |
| 2014/0295339 | A1 | 10/2014 | Kadokura et al. |
| 2015/0153676 | A1* | 6/2015 | Masuyama ........... B29C 43/021 399/281 |
| 2017/0315469 | A1 | 11/2017 | Ishii et al. |
| 2020/0041921 | A1 | 2/2020 | Yamaguchi et al. |
| 2024/0385559 | A1 | 11/2024 | Skillman et al. |

FOREIGN PATENT DOCUMENTS

| | | | | |
|---|---|---|---|---|
| DE | 102012201352 | A1 * | 8/2012 | ........... G03G 15/162 |
| JP | 2004-101958 | A | 4/2004 | |
| JP | 2009-139866 | A | 6/2009 | |

* cited by examiner

DEVELOPER FEED ROLLER, DEVELOPING APPARATUS, ELECTROPHOTOGRAPHIC IMAGE FORMING APPARATUS, AND PROCESS CARTRIDGE

BACKGROUND OF THE INVENTION

Field of the Invention

The present disclosure relates to an electrophotographic roller used in an electrophotographic image forming apparatus, a developing apparatus, and a process cartridge. Also, the present disclosure relates to an electrophotographic image forming apparatus.

Description of the Related Art

In an electrophotographic image forming apparatus (a copy machine, a facsimile, a printer, or the like using an electrophotography scheme; hereinafter, also referred to as an "image forming apparatus" below), a toner is stably charged using an electrophotographic roller (hereinafter, also referred to as a "toner feed roller") that performs toner feeding, is fed to a developing roller, and is then developed to thereby obtain an image on an electrophotographic photosensitive member. In order to stably charge the toner, an elastic roller which has a void on a surface and has conductivity is used as the electrophotographic roller. Japanese Patent Application Laid-open No. 2004-101958 discloses a conductive member has an elastic layer made of foam rubber with carbon nanotubes incorporated thereinto.

Also, Japanese Patent Application Laid-open No. 2009-139866 discloses a conductive roller comprising a substrate that is made of soft polyurethane foam and a conductive coat layer, wherein the substrate is formed of a skeleton and a cell film, the conductive coat layer is provided on at least a part of each of surfaces of the skeleton and the cell film, and the conductive coat layer comprises conductive polyurethane foam comprising carbon nanotubes and a conductive foam layer made of the conductive polyurethane foam on a peripheral surface of core metal.

An image forming apparatus is required to be able to form an excellent electrophotographic image that is stable even in a severe environment. Along with this, a conductive electrophotographic roller used for the image forming apparatus is required to have an electrical resistance that is unlikely change regardless of electric conduction over a long period of time.

According to studies of the present inventors, the conductive member according to Japanese Patent Application Laid-open No. 2004-101958, when used as a tonner feed roller, tended to increase the electrical resistance of the electrophotographic roller through electric conduction over a long period of time. Also, the conductive roller according to Japanese Patent Application Laid-open No. 2009-139866 is disadvantageous in terms of cost because the conductive coat layer is formed on the surfaces of the skeleton and the cell film through dip coating and the number of manufacturing processes is large.

SUMMARY OF THE INVENTION

At least one aspect of the present disclosure is directed to provision of an electrophotographic roller that exhibits a small change in electrical resistance regardless of electric conduction over a long period of time and can be manufactured at low cost. Also, at least one aspect of the present disclosure is directed to provision of a developing apparatus that is able to contribute to the stable development of an electrophotographic image with high quality. Furthermore, at least one aspect of the present disclosure is directed to provision of an electrophotographic image forming apparatus capable of stably outputting an electrophotographic image with high quality. Moreover, at least one aspect of the present disclosure is directed to provision of a process cartridge that is able to contribute to a stable output of an electrophotographic image with high quality.

At least one aspect of the present disclosure is directed to provide an electrophotographic roller comprising:
- a substrate that has a conductive surface; and
- a conductive layer on the surface of the substrate, wherein
  - the conductive layer is a surface layer of the electrophotographic roller, and
  - the conductive layer has a skeleton comprising polyurethane as a binder and an electron conductive filler in the polyurethane,
- the conductive layer comprises at least one void,
- at least a part of an inner wall of the void is configured of the skeleton, and
- when an electrode is brought into contact with an outer surface of the conductive layer and an AC voltage with an inter-peak voltage of 50 V is applied between the electrode and the surface of the substrate in a frequency range of 0.1 to 10 Hz, an absolute value of a phase delay θ of an AC impedance with respect to the AC voltage is 10 degrees or less.

At least one aspect of the present disclosure is directed to provide a developing apparatus comprising, at least:
- a developing roller; and
- a developer feed roller that feeds a developer to the developing roller, wherein
- the developing apparatus is configured such that a voltage is able to be applied between the developing roller and the developer feed roller, and
- the developer feed roller is the electrophotographic roller described above.

At least one aspect of the present disclosure is directed to provide an electrophotographic image forming apparatus comprising the developing apparatus described above.

At least one aspect of the present disclosure is directed to provide a process cartridge that is detachably attachable from a main body of an electrophotographic image forming apparatus,
- the process cartridge comprising;
  - a contact member that is electrically connected to an electrical contact of the main body when the process cartridge is attached to the main body;
  - a developing roller; and
  - a developer feed roller that feeds a developer to the developing roller,
- the process cartridge is configured such that a voltage is able to be applied between the developing roller and the developer feed roller through electrical connection to the main body, and
- the developer feed roller is the electrophotographic roller described above.

According to at least one aspect of the present disclosure, it is possible to obtain an electrophotographic roller that has a small change in electrical resistance regardless of electric conduction over a long period of time and can be manufactured at low cost. Also, according to at least one aspect of the present disclosure, it is possible to obtain a developing apparatus that is able to be contribute to stable development of an electrophotographic image with high quality. Furthermore, according to at least one aspect of the present disclosure, it is possible to obtain an electrophotographic image forming apparatus capable of stably outputting an electrophotographic image with high quality. Moreover, according to at least one aspect of the present disclosure, it is possible to obtain a process cartridge that is able to be contribute to a stable output of an electrophotographic image with high quality.

Further features of the present invention will become apparent from the following description of exemplary embodiments with reference to the attached drawings.

DESCRIPTION OF THE EMBODIMENTS

Figure 1A:
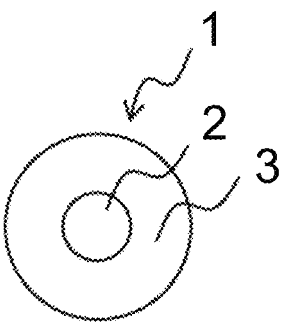
FIGS. 1A and 1B are a schematic sectional view and a schematic perspective view of an electrophotographic roller.

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined. In addition, in the present disclosure, for example, descriptions such as "at least one selected from the group consisting of XX, YY and ZZ" mean any of XX, YY, ZZ, the combination of XX and YY, the combination of XX and ZZ, the combination of YY and ZZ, and the combination of XX, YY, and ZZ.

As described above, in the conductive roller according to Japanese Patent Application Laid-open No. 2004-101958, an electrical resistance may change when it is used for image formation over a long period of time as a toner feed roller. The present inventors have inferred the reason therefor as follows. In other words, in the conductive roller according to Japanese Patent Application Laid-open No. 2004-101958, the foam rubber as an elastic layer is formed by mixing air bubbles into a composition in which rubber latex and a water dispersion with carbon nanotubes dispersed therein using a surfactant are mixed, foaming the composition, and then vulcanizing the composition. In the above composition, the carbon nanotubes are dispersed as emulsion particles surrounded with the surfactant in the rubber latex. Therefore, the carbon nanotubes are present in individual emulsion particles in the foam rubber after the vulcanization, and it is considered that an ionic component that is responsible for transport of charge that is present in the rubber and the surfactant is interposed between the carbon nanotubes.

Also, it is considered that once a voltage has been applied to the electrophotographic roller over a long period of time, the electrical resistance will change due to degradation of the rubber which is interposed between the carbon nanotubes and polarization of the ionic component.

The present inventors have conducted studies in order to obtain an electrophotographic roller that has a small change in electrical resistance regardless of utilization over a long period of time even with a simpler configuration. As a result, the present inventors have discovered that an electrophotographic roller with the following configuration is able to be contribute to achievement of the above purpose.

The electrophotographic roller comprises a substrate that has a conductive surface and a conductive layer on the surface of the substrate. The conductive layer is a surface layer of the electrophotographic roller, and has a skeleton comprising polyurethane as a binder and an electron conductive filler in the polyurethane. The conductive layer comprises at least one void, and at least a part of an inner wall of the void is configured of the skeleton. When an electrode is brought into contact with an outer surface of the conductive layer and an AC voltage with an inter-peak voltage of 50 V is applied between the electrode and the surface of the substrate in a frequency range of 0.1 to 10 Hz, an absolute value of a phase delay θ of an AC impedance with respect to the AC voltage is 10 degrees or less.

The electrophotographic roller comprises a substrate that has a conductive surface and a conductive layer on an outer peripheral surface of the substrate. The conductive layer is a surface layer of the electrophotographic roller.

When an electrode is brought into contact with an outer surface of the conductive layer and an AC voltage with an inter-peak voltage of 50 V is applied between the electrode and a conductive outer surface of the substrate in a frequency range of 0.1 to 10 Hz, an absolute value of a phase delay θ of an AC impedance with respect to the AC voltage is 10.0 degrees or less.

The reason that the inter-peak voltage is set to 50 V is to be compatible with a voltage to be applied when the electrophotographic roller is actually used in an electrophotographic apparatus.

Also, the reason that the frequency range of the AC voltage to be applied is set to 0.1 to 10 Hz is because measurement accuracy for θ is high, it is possible to reduce an influence of a capacitive component caused by an interface between the surface of the electron conductive filler and polyurethane to an ignorable level, and the absolute value of θ and a trend of variation in electrical resistance through electric conduction are well correlated. In other words, it is possible to accurately measure the absolute value of θ under conditions corresponding to a state in which the electrophotographic roller is actually used by applying the AC voltage with an inter-peak voltage of 50 V in the frequency range of 0.1 to 10 Hz.

The absolute value of θ is preferably 5.0 degrees or less and is more preferably 3.0 degrees or less. In other words, θ is from −10.0 degrees to 10.0 degrees, is preferably from −5.0 degrees to 5.0 degrees, and is further preferably from −3.0 degrees to 3.0 degrees.

Figure 4:
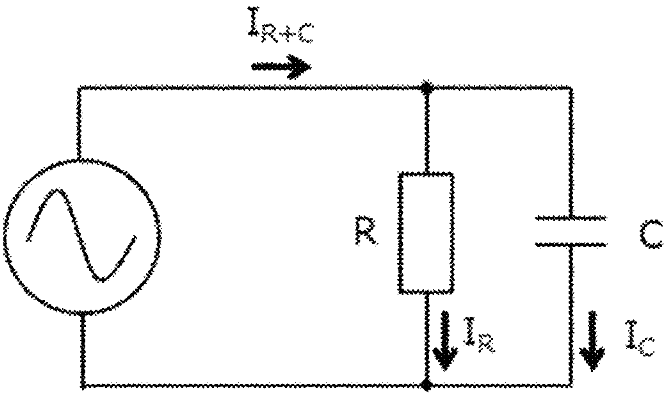
FIG. 4 is a schematic diagram illustrating an RC parallel circuit.

An impedance of the electrophotographic roller according to the present disclosure can be represented by an impedance of an RC parallel circuit illustrated in FIG. 4. A current flowing through the electrophotographic roller with respect to the applied AC voltage is a total $I_{R+C}$ of $I_R$ flowing through a resistance component R and $I_C$ flowing through a capacitive component C. $I_R$ is a component in the same phase as that of the applied voltage in $I_{R+C}$, and $I_C$ is a component with a phase delayed by 90° with respect to the applied voltage.

Figure 5:
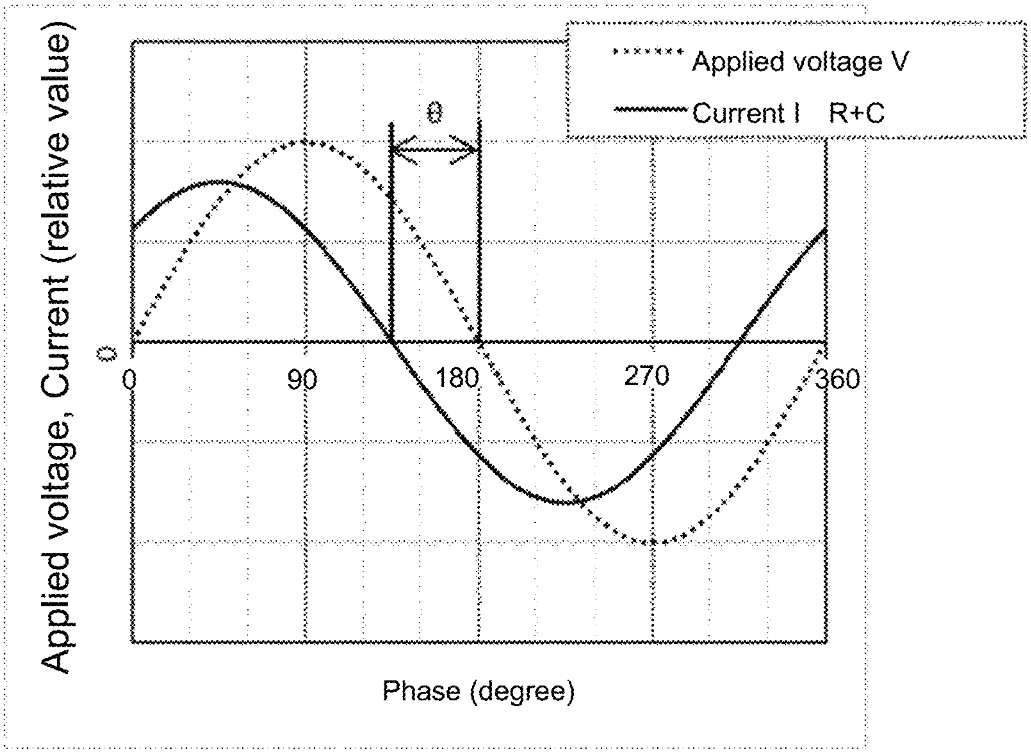
FIG. 5 is a schematic diagram illustrating a relationship among an applied voltage V, a current I flowing through an RC parallel circuit, and a phase delay θ.
Figure 6:
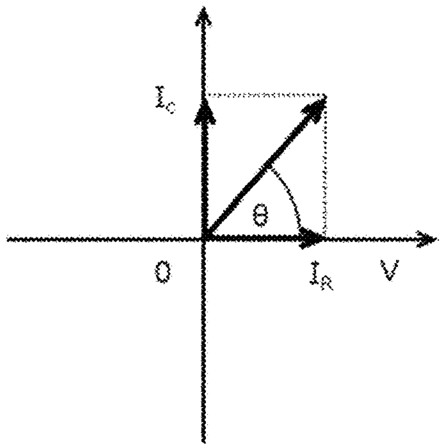
FIG. 6 is a schematic diagram illustrating polar coordinate display of θ.

If $I_{R+C}$ in a steady state and the applied voltage V are represented on a graph representing an applied voltage or a current (relative value) on a vertical axis and representing a phase on a horizontal axis, it is possible to represent them as in FIG. 5. An angle at which the phase of $I_{R+C}$ is delayed with respect to the applied voltage V is θ. Also, θ can be represented as in FIG. 6 when it is represented by polar coordinates. When the applied voltage V is represented by the horizontal axis, a synthetic vector of the current component $I_R$ in the same phase (phase delay of 0°) as that of the applied voltage V and the current $I_C$ of the capacitive component with the phase delayed by 90° with respect to the applied voltage V is $I_{R+C}$, and an angle formed between $I_{R+C}$ and the horizontal axis is the phase delay θ of the AC impedance.

Figure 7:
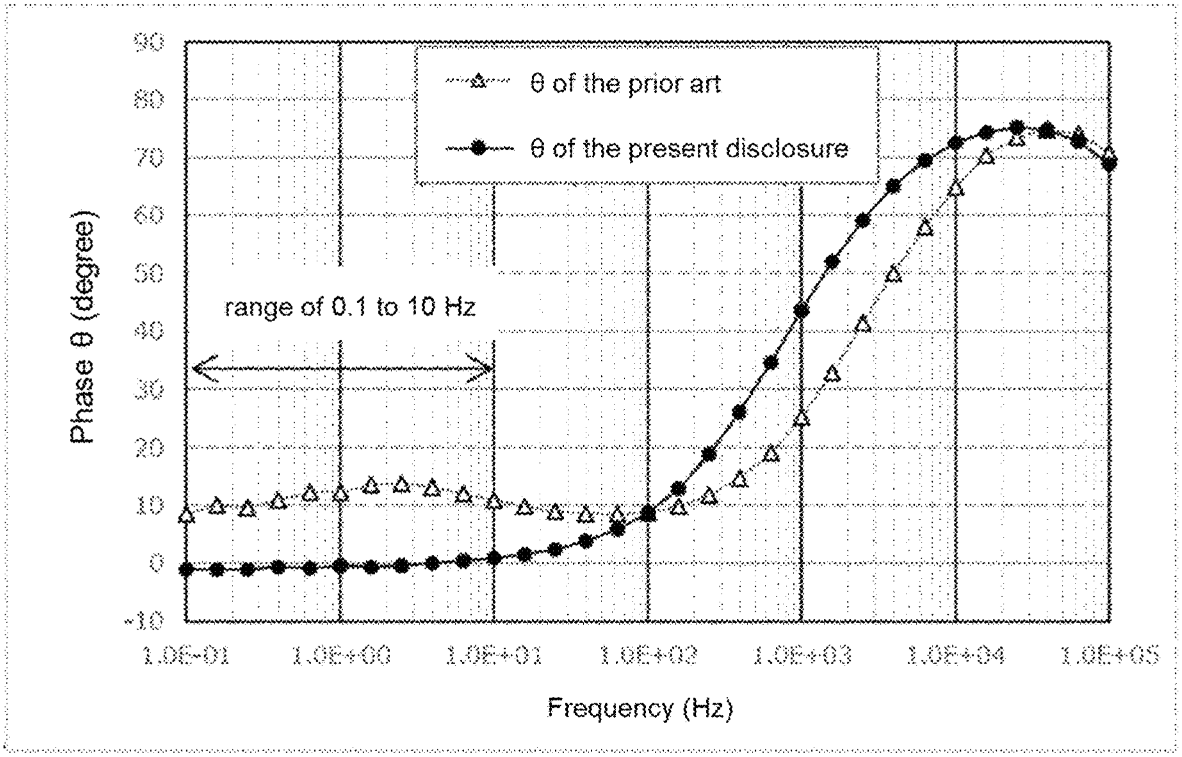
FIG. 7 is a schematic diagram illustrating frequency dependency of θ.

FIG. 7 illustrates a diagram in which relationships between θ and a frequency in the electrophotographic roller according to the present disclosure and the electrophotographic roller in the prior art are compared. In the electrophotographic roller according to the present disclosure, θ satisfies $-10 \leq \theta \leq 10$ in a frequency range of 0.1 to 10 Hz (1.0E−01 to 1.0E+01 Hz). In other words, the absolute value of the phase delay θ is 10 degrees or less. On the other hand, an absolute value of θ in the electrophotographic roller in the prior art is greater than 10 in the frequency region of 0.1 to 10 Hz.

The fact that the absolute value of θ is small indicates that the component ($I_R$) in the same phase as that of the applied voltage in $I_{R+C}$ is large and the component ($I_C$) with the phase delayed by 90° with respect to the applied voltage is small. In other words, the amount of electron conductive current component that is attributable to the current in proportional to the applied voltage is large, while the amount of ion conductive current component is small.

In a case in which electric conduction degradation is considered, a change in the electron conductive current component is small even after electric conduction over a long period of time, while the ion conductive current component gradually decreases during electric conduction over a long period of time due to ion movement and polarization. Therefore, as a characteristic of the electrophotographic roller capable of curbing electric conduction degradation, the amount of ion conductive current component is preferably small. In other words, it is possible to obtain an electrophotographic roller that has a small amount of ion conductive current component and is unlikely to cause electric conduction degradation by performing control such that θ becomes small.

Also, a change in current in a case in which a DC voltage is continuously applied is not cyclically repeated since a potential difference between electrodes is constant, and it is possible to regard the change as a change in current when a limit is taken in the direction of a frequency of zero. Therefore, if the absolute value of θ is small in a region in which the frequency is low (a frequency region of 0.1 to 10 Hz), the amount of ion conductive current component is small, and it is possible to reduce power distribution degradation.

The inventors of the present application have discovered from the above reasons that it is possible to obtain an electrophotographic roller with small electric conduction degradation even in a case in which it is used with electric conduction over a long period of time by setting the absolute value of the phase delay θ of the AC impedance with respect to the AC voltage to be 10 degrees or less when the developing member is brought into contact with the outer surface of the conductive layer of the electrophotographic roller and an AC voltage with an inter-peak voltage of 50 V is applied in the frequency range of 0.1 to 10 Hz between the developing member and the conductive layer, and have devised the present invention.

As a specific method for reducing the absolute value of θ in the frequency region of 0.1 to 10 Hz, it is preferable to increase the proportion of the electron conductive current component in the conductive layer and to reduce the proportion of the ion conductive current component.

It is possible to reduce the absolute value of θ in the frequency range of 0.1 to 10 Hz by changing the type of the electron conductive filler, increasing the content of the electron conductive filler in the conductive layer, or molding the conductive layer while causing foam with the porosity of the conductive layer increased, for example.

In other words, the capacitive component due to the interface polarization between the electron conductive filler particles decreases by employing the configuration in which conductive material pieces are aligned in contact with each other inside a skeleton, which will be described later, and a conductive path is thereby formed, and it is possible to reduce the absolute value of θ in the frequency region of 0.1 to 10 Hz.

In order to increase the proportion of the electron conductive current component in a middle resistance region ($10^5$ to $10^9$ Ω·cm) that is typically used for the electrophotographic roller, it is necessary to connect the conductive path of the electron conductive filler. Although the conductive path is connected and works in a direction in which the absolute value of θ decreases if a large amount of electron conductive filler is added, the conductive layer is hardened on the other hand due to the addition of the electron conductive filler, and it becomes unsuitable as an electrophotographic roller which is required to have flexibility.

In other words, there is a problem in obtaining an electrophotographic roller with appropriate hardness and flexibility as an electrophotographic roller while the proportion of the electron conductive current component is increased by increasing the amount of electron conductive filler to be added.

The present inventors have discovered as a result of intensive studies that it is possible to reduce the absolute value of θ in the frequency region of 0.1 to 10 Hz and to curb electric conduction degradation while exhibiting appropriate flexibility for the electrophotographic roller by the conductive layer comprising carbon nanotubes. More specifically, it is possible to obtain the electrophotographic roller capable of further reducing θ and thereby further reducing electric conduction degradation while exhibiting appropriate hardness as the electrophotographic roller through an improvement in dispersion of the carbon nanotubes in polyurethane using the nonionic surfactant.

Electrophotographic Roller

Figure 1B:
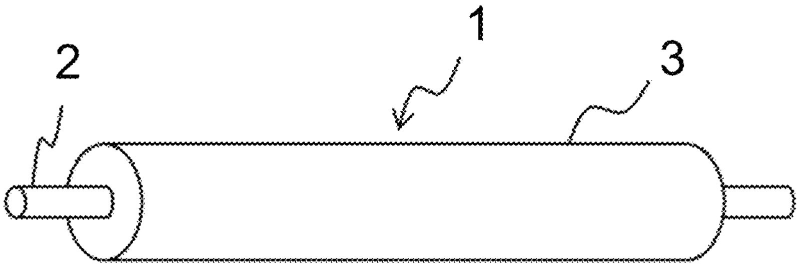

FIG. 1A illustrates a schematic sectional view of an electrophotographic roller, and FIG. 1B illustrates a schematic perspective view of the electrophotographic roller. An electrophotographic roller 1 has a conductive substrate 2 and a conductive layer 3 on an outer peripheral surface of the substrate. The electrophotographic roller can be used as a developer feed roller for an electrophotographic image forming apparatus.

The conductive layer is a surface layer of the electrophotographic roller and has a skeleton comprising polyurethane and an electron conductive filler in polyurethane. Polyurethane acts as a binder resin for a conductive layer. The conductive layer comprises at least one void. Polyurethane may be foamed polyurethane. In other words, the conductive layer may be a foam layer.

Note that the layer configuration of the electrophotographic roller 1 is not limited to the configuration comprises only the substrate 2 and the conductive layer 3 and may further comprises another layer such as a conductive elastic layer or the like between the substrate 2 and the conductive layer 3.

Hereinafter, the configuration of the electrophotographic roller will be described in detail.

Substrate

The substrate 2 has a conductive surface and functions as a support member for the electrophotographic roller and an electrode.

The substrate is configured of, for example: a metal or an alloy such as aluminum, a copper alloy, or stainless steel; iron plated with chromium or nickel; and a conductive material such as a synthetic resin with conductivity. For example, the substrate may be a core metal. The substrate has a solid columnar shape or a hollow cylindrical shape, for example.

Conductive Layer

The conductive layer is formed on an outer peripheral surface of the substrate. The conductive layer is a surface layer of the electrophotographic roller.

The conductive layer 3 has a skeleton comprising polyurethane as a binder and an electron conductive filler in polyurethane. The conductive layer comprises at least one void. The void in the conductive layer accommodates toner inside the conductive layer and uniformly feeds, in a developer feed roller, the toner to the surface of the developing roller (developing member). In other words, the electrophotographic roller can be used as a developer feed roller.

Air Gap

The conductive layer comprises at least one void. Although the shape of the void is not particularly limited, for example, a void opening from the outer surface of the conductive layer and extending in the thickness direction of the conductive layer is exemplified. The void may be a through-hole or may be a non-through-hole.

Also, the void may be formed alone, or in another example, a plurality of voids may be formed in a mutually coupled foam (continuous foam) state. In other words, the conductive layer may be in a porous form comprising a large number of voids. The conductive layer preferably comprises a plurality of voids, and the voids are preferably formed in a continuous foam state.

At least a part of an inner wall of each void is preferably configured of a skeleton comprising polyurethane and an electron conductive filler in polyurethane. The inner wall of the void is preferably configured of the skeleton. The inner wall of the void is preferably formed of polyurethane and the electron conductive filler in polyurethane.

The porosity which is a volume fraction of the void in the conductive layer is preferably 50 to 97% by volume. The electrophotographic roller can appropriately store the toner if the porosity falls within the above range, which is preferable. Also, by increasing the porosity, the conductive path between the electron conductive filler particles forming the inner wall of the void is more likely to be connected, and it is possible to increase the proportion of the electron conductive current component. As a result, it is possible to reduce θ and to curb electric conduction degradation, which is preferable. The porosity can be measured by a method which will be described later.

The porosity of the conductive layer is more preferably 60 to 95% by volume and is further preferably 70 to 90% by volume. The void is formed in the conductive layer by the material forming in a manufacturing process of the conductive layer. The porosity can be controlled by the type of foaming agent and the amount of addition. Specifically, it is possible to increase the porosity by increasing the amount of added foaming agent and to reduce the porosity by reducing the amount of added foaming agent.

An average cell diameter in the surface, the number of cells, the air permeation amount, the density of the entire layer, and the like of the conductive layer can be arbitrarily set for the conductive layer having such a void. Although physical property values of the conductive layer (foam layer) are not particularly limited, the conductive layer preferably has values within the following numerical value ranges, for example.

The average cell diameter in the surface is a value indicating an equivalent circle diameter of the opening portion of the void appearing in the surface of the conductive layer. The average cell diameter in the surface is preferably from 100 to 500 μm, for example. The number of cells is a value indicating the number of opening portions of the voids appearing in the surface of the conductive layer present in a unit length (per 1 inch) in the surface of the conductive layer. The number of cells is preferably from 50 to 300 cells/inch, for example. The cell diameter and the number of cells can be obtained by processing an image obtained by taking a photograph of the surface of the electrophotographic roller using a video microscope, for example.

The air permeation amount is a value indicating how easily air passes through the conductive layer. The amount of permeable air is obtained by pinching the electrophotographic roller with a jig which has a cylindrical shape with a diameter that is smaller than the diameter of the electrophotographic roller by 1 mm and which is provided with a hole with a diameter of 10 mm at a position facing the electrophotographic roller in a circumferential direction and measuring the amount of flowing air per minute when the pressure difference of the hole is set to 125 Pa. The amount of permeable air is preferably from 0.5 to 3.0 L/min, for example. The density of the entire layer is a value indicating the density of the entire conductive layer has the skeleton, which will be described later, and the void. The density of the entire layer is preferably from 0.05 to 0.20 g/cm$^3$, for example. The volume of the conductive layer has the skeleton and the void is obtained from the outer diameter of the electrophotographic roller, the diameter of the substrate, the length of the conductive layer, and the like, and the density of the entire conductive layer can be thereby obtained from the volume and the mass of the conductive layer.

Skeleton

The conductive layer has a skeleton comprising polyurethane and an electron conductive filler in polyurethane. Polyurethane acts as a binder resin in the conductive layer. As the electron conductive filler, it is possible to use electron conductive fillers listed below.

Polyurethane is preferably a crosslinked polyurethane resin which has been crosslinked. The crosslinked urethane resin is a reactant of polyol and a compound having an isocyanate group. For example, if a compound having an isocyanate group is added to and mixed with a mixture of the electron conductive filler and polyol, and the mixture is caused to react, the mixture foams and is hardened, the skeleton configuring the conductive layer and the void which is a clearance in the skeleton are generated. As a result, it is possible to obtain a conductive layer has the skeleton comprising polyurethane and the electron conductive filler and having the void.

Electron Conductive Filler

As a conducting agent for the electrophotographic roller, an electron conductive filler can be used. Although the electron conductive filler is not particularly limited, it is possible to list (1) to (7) below, for example.

(1) Carbon nanotube
(2) Carbon powder such as acetylene black, KETJEN BLACK, polyacrylonitrile (PAN)-based carbon, or pitch-based carbon
(3) Graphite
(4) Fine metal particle or fiber of aluminum, palladium, nickel, iron, copper, silver, or the like
(5) Fine particles of metal oxide such as conductive titanium oxide, conductive tin oxide, or conductive zinc oxide
(6) Metal compound powder of copper sulfide, zinc sulfide, or the like
(7) Powder obtained by causing tin oxide, indium oxide, molybdenum oxide, zinc, aluminum, gold, silver, copper, titanium, chromium, tungsten, iron, cobalt, nickel, palladium, rhodium, osmium, iridium, platinum, or the like to adhere to a surface of an appropriate particle through electrolysis, spray coating, mixing through shaking, or the like.

The electron conductive filler can be used alone, or two or more kinds thereof may be used in combination. In other words, the electron conductive filler may comprise a first electron conductive filler and a second electron conductive filler that is different from the first electron conductive filler. The first electron conductive filler preferably comprises a carbon nanotube. Since the carbon nanotube has high conductivity and can apply conductivity to the skeleton through addition of a small amount of carbon nanotube, the carbon nanotube is preferable from the viewpoint of obtaining appropriate flexibility for the developer feed roller.

As carbon nanotubes, there are a metal conductive carbon nanotube and a semiconductor conductive carbon nanotube. As the carbon nanotube in the electron conductive filler, the metal conductive carbon nanotube is preferably comprised.

Also, as the carbon nanotubes, there are a single-layer carbon nanotube and a multi-layer carbon nanotube. As the carbon nanotube in the electron conductive filler, the single-layer carbon nanotube is preferably comprised. The single-layer carbon nanotube has conductivity and is flexibly bent, thereby exhibits sufficient conductivity for the conductive layer of the electrophotographic roller, can have appropriate hardness and flexibility, and is thus more preferable.

The electron conductive filler may further comprise the second electron conductive filler that is different from the above first electron conductive filler. The second electron conductive filler preferably comprises at least one selected from a group consisting of carbon black, graphite, a fine metal particle, and tin oxide.

The content of the electron conductive filler in the conductive layer is preferably 0.001 to 15% by mass and is more preferably 0.001 to 5% by mass. In a case in which a plurality of electron conductive fillers are comprised, the total of the content of each electron conductive filler (total content) is preferably within the above range.

The content of the first electron conductive filler in the conductive layer is preferably 0.01 to 0.8% by mass and is more preferably 0.001 to 0.05% by mass. In a case in which the conductive layer comprises the carbon nanotube as the first electron conductive filler, the content of the carbon nanotube in the conductive layer is preferably 0.001 to 1% by mass and is more preferably 0.001 to 0.8% by mass.

The content of the second electron conductive filler in the conductive layer is preferably 0.001 to 1.0% by mass and is more preferably 0.5 to 4.95% by mass. In a case in which two or more kinds of conductive fillers are comprised as second electron conductive fillers, the total of the contents of the conductive fillers used as the second electron conductive fillers (total content) is preferably within the above range.

It is possible to further reduce the absolute value of θ and to further curb electric conduction degradation by setting the content of the electron conductive fillers in the conductive layer within the above range.

The electron conductive filler is preferably added as a dispersion obtained by causing the electron conductive filler to be dispersed in a solution. Examples of the solution include polyethylene glycol alkyl ether and an aliphatic carboxylic acid derivative. For example, it is possible to use a polyethylene glycol alkyl ether dispersion of a carbon nanotube, an aliphatic carboxylic acid derivative dispersion of a carbon nanotube, or the like. The above dispersion preferably comprises 5 to 15% by mass of electron conductive filler.

The conductive path of the electron conductive filler is likely to connect and it is possible to reduce the absolute value of θ by adding the electron conductive filler as a dispersion. As a result, it is easier to curb electric conduction degradation, which is preferable. Also, the electron conductive filler and the dispersion of the electron conductive filler may be used together.

Polyurethane

Polyurethane is a reactant of polyol and a compound having an isocyanate group (isocyanate compound).

Polyurethane can be obtained by causing polyol and the isocyanate compound to react.

Polyol

Examples of polyol forming polyurethane include polyether polyol, polyether polyol, acryl polyol, polycarbonate polyol, and polycaprolactone polyol. Among these, it is preferable to use polyether polyol since a crosslinked urethane resin formed therefrom has sufficient flexibility.

As polyether polyol, it is possible to list the following polyether polyol, for example: polyethylene glycol, polypropylene glycol, poly 1,4-butanediol, poly 1,5-pentandiol, polyneopentyl glycol, poly 3-methyl-1,5-pentandiol, poly 1,6-hexanediol, poly 1,8-octanediol, poly 1,9-nonanediol, and the like. Among these, polypropylene glycol, poly 1,4-butanediol, poly 1,5-pentanediol, polyneopentyl glycol, poly 3-methyl-1,5-pentanediol, and poly 1,6-hexanediol are preferably used from the viewpoint of curbing an increase in hardness of the crosslinked urethane resin. Polyol preferably comprises polyethylene propylene ether triol, for example. It is possible to use polyethylene propylene ether triol or the like with a molecular weight of about 2000 to 6000, for example. Examples of commercial products that can be used include ACTOCOL EP-550N (product name; manufactured by Mitsui Chemicals, Inc.), ACTOCOL EP-950P (product name; manufactured by Mitsui Chemicals, Inc.), ACTOCOL EP-505S (product name; manufactured by Mitsui Chemicals, Inc.), and the like.

As polyester polyol, it is possible to list the following polyester polyols, for example: polyester polyol obtained through a condensation reaction between a diol component such as ethylene glycol, propylene glycol, 1,4-butanediol, 1,5-pentanediol, neopentyl glycol, 3-methyl-1,5-pentanediol, 1,6-hexanediol, 1,8-octanediol, or 1,9-nonanediol or a triol component such as trimethylol propane and dicarboxylic acid such as an adipic acid, a suberic acid, a sebacic acid, phthalic anhydride, a terephthalic acid, or a hexahydroxyphthalic acid. Among these, polyester polyol obtained through a condensation reaction between a diol component such as propylene glycol, 1,4-butanediol, 1,5-pentandiol, neopenthyl glycol, 3-methyl-1,5-pentanediol, or 1,6-hexanediol and a dicarboxylic acid such as an adipic acid, a suberic acid, or a sebacic acid is preferably used from the viewpoint of curbing an increase in hardness of the cross-linked urethane resin.

As polycaprolactone polyol, it is possible to list the following polycaprolactone polyol, for example: poly ε-caprolactone and poly γ-caprolactone.

As polycarbonate polyol, it is possible to list the following polycarbonate polyol: polycarbonate polyol or the like obtained through a condensation reaction with a diol component such as ethylene glycol, propylene glycol, 1,4-butanediol, 1,5-pentanediol, neopentyl glycol, 3-methyl-1,5-pentanediol, 1,6-hexanediol, 1,8-octanediol, or 1,9-nonanediol, dialkyl carbonate such as phosgene or dimethyl carbonate, or cyclic carbonate such as ethylene carbonate.

Among these, polycarbonate polyol obtained through a condensation reaction with a diol component such as neopentyl glycol, 3-methyl-1,5-pentanediol, 1,5-pentanediol, 1,6-hexanediol, or 1,8-octanediol or dialkyl carbonate such as dimethyl carbonate is preferably used from the viewpoint of curbing an increase in hardness of the crosslinked urethane resin.

Such polyol components may be formed into prepolymers with chains extended by an isocyanate compound such as 2,4-tolylene diisocyanate (TDI), 4,4'-diphenyl methane diisocyanate (MDI), or isophorone diisocyanate (IPDI) in advance as needed. Also, polyol can be used alone, or two or more kinds may be used in combination. Polyol may be mixed with the electron conductive filler and a foaming agent, a foam stabilizer, and a catalyst, which will be described later, and may be added as a polyol mixture as needed.

Isocyanate Compound

The isocyanate compound has an isocyanate group. Although not particularly limited, it is possible to list the following examples: aliphatic polyisocyanate such as ethylene diisocyanate and 1,6-hexamethylene diisocyanate (HDI); alicyclic polyisocyanate such as isophorone diisocyanate (IPDI), cyclohexane-1,3-diisocyanate, and cyclohexane-1,4-diisocyanate; aromatic isocyanate such as 2,4-tolylene diisocyanate, 2,6-tolylene diisocyanate (TDI), 4,4'-diphenyl methane diisocyanate (MDI), polymeric diphenyl methane diisocyanate, xylylene diisocyanate, and naphthalene diisocyanate; and copolymers, isocyanurates, TMP adducts, biurets, blocks, and the like thereof. Among these, it is preferable to comprise aromatic isocyanate such as tolylene diisocyanate or diphenyl methane diisocyanate.

The isocyanate compound may be used alone, or two or more kinds of isocyanate compounds may be used in combination. For example, the isocyanate compound is preferably a mixture comprising tolylene diisocyanate and diphenyl methane diisocyanate. As such an isocyanate compound, it is possible to use COSMONATE TM20 (product name; manufactured by Mitsui Chemicals, Inc.) or COSMONATE TM50 (product name; manufactured by Mitsui Chemicals, Inc.), for example.

Polyol and the isocyanate compound are preferably mixed such that the ratio (molar ratio) of the isocyanate group comprised in the isocyanate compound falls within a range of from 0.9 to 2.0 with respect to 1.0 mol of hydroxyl group comprised in polyol. Furthermore, polyol and the isocyanate compound are more preferably mixed such that the above molar ratio falls within a range of from 0.95 to 1.05. It is possible to reduce unreacted components remaining after the reaction between polyol and the isocyanate compound if the mixing ratio falls within the above range.

Dispersant

The conductive layer may comprise a dispersant. As the dispersant, a nonionic surfactant (non-ionic surfactant) is preferably comprised. It becomes easy to disperse the electron conductive filler in the skeleton and to connect the conductive path between the electron conductive filler particles by the conductive layer comprising the dispersant, which is preferable.

In a case in which a carbon nanotube is used as the electron conductive filler, in particular, the conductive layer preferably comprises a nonionic surfactant as a dispersant for dispersing the carbon nanotube. It is possible to improve dispersibility of the carbon nanotube in polyurethane by using the nonionic surfactant.

The dispersant such as the nonionic surfactant comprised in the conductive layer can be extracted from the conductive layer using a solvent such as acetone, methyl ethyl ketone, or tetrahydrofuran.

It is possible to specify the type of the dispersant comprised in the conductive layer by dissolving the extracted nonionic surfactant in a solvent such as deuterochloroform or deuteroacetone and performing analysis through nuclear magnetic resonance (NMR) or gel permeation chromatography (GPC).

A cationic surfactant (ionic surfactant) is not preferable since it disconnects the conductive path of the carbon nanotube and brings about a skeleton which makes electric conduction degradation likely to occur. On the other hand, the nonionic surfactant (non-ionic surfactant) has an action of dispersing the carbon nanotube in the skeleton and connecting the conductive path of the carbon nanotube, is unlikely to cause electric conduction degradation, and is thus more preferable as a dispersant.

Although the nonionic surfactant is not particularly limited, it is possible to list the following examples: a block polymer of a higher alcohol comprising polyalkylene glycol alkyl ether and polyether; a polymer obtained by adding polyether to a polyhydric alcohol; and a polymer obtained by adding polyether to alkylamine.

The nonionic surfactant preferably comprises polyalkylene glycol alkyl ether. As polyethylene glycol alkyl ether, it is possible to use, for example, polyethylene glycol monolauryl ether or the like. The content of such a nonionic surfactant in the skeleton is preferably equivalent to the content of the carbon nanotube in the skeleton or is preferably larger than the content of the carbon nanotube in the skeleton. The content of the nonionic surfactant in the skeleton is preferably one to ten times and is more preferably three to ten times the content of the carbon nanotube in the skeleton.

Other Additives

The skeleton may comprise a catalyst, a foaming agent, a foam stabilizer, and other additives as needed. Such an additive may be mixture with polyol and the electron conductive filler in advance and may be added as a polyol mixture.

The catalyst is not particularly limited, and it is possible to select and use an appropriate one from among various catalysts that are known in the prior art. For example, an amine-based catalyst (such as triethylene diamine, bis(dimethylaminoethyl) ether, N,N,N'N'-tetramethylhexanediamine, 1,8-diazabicyclo(5.4.0) undecane-7, 1,5-diazabicyclo(4.3.0)-5-nonene, 1,2-dimethylimidazole, N-ethylmorpholine, or N-methylmorpholine), an organic metal-based catalyst (such as tinoctoate, tin oleate, dibutyltin dilaurate, dibutyltin diacetate, tetra-i-propoxy titanium, tetra-n-butoxy titanium, or tetrakis(2-ethylhexyloxy) titanium), or an acid salt catalyst obtained by decreasing initial activities of the amine-based catalyst and the organic metal-based catalyst (such as carboxylate, formate, octylate, or borate) is used. One kind of catalyst may be used alone, or two or more kinds may be used in combination.

The foaming agent is not particularly limited, and it is possible to select and use an appropriate one from among various foaming agents that are known in the prior art. Particularly, water is suitably used as a foaming agent since water reacts with polyisocyanate and generates carbon dioxide gas. Also, another foaming agent and water may be used together. For example, it is possible to use ion exchange water as the foaming agent.

The amount of added foaming agent in the materials forming the conductive layer is preferably 0.5 to 3.0 parts by mass and is more preferably 1.0 to 2.0 parts by mass. It is possible to obtain porosity of the conductive layer within an appropriate range by setting the amount of added foaming agent within the above range.

The foam stabilizer is not particularly limited, and it is possible to select and use an appropriate one from among various foam stabilizers that are known in the prior art. For example, a silicone foam stabilizer or the like can be used.

As other additives, a crosslinking age, a flame retardant, a coloring agent, an ultraviolet absorber, an antioxidant, or the like may be used within a range in which the effects of the present disclosure are not hindered as needed.

Average Elastic Modulus of Conductive Layer

If hardness of the conductive layer in the electrophotographic roller is excessively high, the conductive layer may shave a toner carrying roller which the conductive layer abuts in a case in which the electrophotographic roller is used as a toner feed roller, and the surface of the toner carrying roller may be scratched. An average elastic modulus of the conductive layer of the electrophotographic roller measured using an SPM is preferably 2000 MPa or less. Appropriate flexibility of the conductive layer which is an outer surface of the electrophotographic roller is achieved, and the toner carrying roller is unlikely to be scraped by setting the average elastic modulus of the conductive layer to be 2000 MPa or less, which is preferable.

The above average elastic modulus of the conductive layer is preferably 1000 to 2000 MPa and is more preferably 1300 to 1800 MPa. The average elastic modulus of the conductive layer can be controlled by the type and the amount of incorporated electron conductive filler, for example. For example, it is possible to reduce the average elastic modulus of the conductive layer by the electron conductive filler comprising a carbon nanotube. Also, it is possible to increase the average elastic modulus of the conductive layer by increasing the amount of incorporated electron conductive filler in the materials forming the conductive layer.

Method of Forming Conductive Layer

A method of forming the conductive layer is not particularly limited. It is possible to use a method using a foaming agent, a method of mixing air bubbles through mechanical stirring, or the like. Note that a foaming ratio may be appropriately set and is not particularly limited.

For example, a compound having an isocyanate group is added to and mixed with a mixture of the electron conductive filler and polyol, the mixed composition thereby foams and is hardened, and it is thus possible to form the conductive layer. In other words, a method of manufacturing the electrophotographic roller preferably includes a process of causing a composition comprising the following materials to foam and be hardened to thereby obtain the conductive layer.

(1) Electron conductive filler
(2) Polyol
(3) Isocyanate compound
(4) Foaming agent
(5) Foam stabilizer
(6) Catalyst As described above, polyol and the isocyanate compound are materials for forming polyurethane. The electron conductive filler and polyol may be mixed in advance to obtain a polyol mixture. The polyol mixture may comprise a foaming agent, a foam stabilizer, and a catalyst. In other words, it is possible to obtain the conductive layer by foaming and hardening a composition obtained by mixing the polyol mixture comprising the electron conductive filler, polyol, a foaming agent, a foam stabilizer, and a catalyst and the isocyanate compound.

Since the conductive layer can be formed only through the above reaction, it is possible to easily produce the electrophotographic roller according to the present disclosure.

A method of bonding the substrate to the conductive layer is not particularly limited. It is possible to use a method of disposing the substrate inside a mold (molding mold) in advance and pouring and hardening the ingredient composition as described above, a method of molding the ingredient composition into a predetermined shape of the conductive layer in advance and attaching it to the substrate, or the like. In any method, another layer such as a conductive adhesive layer or elastic layer may be comprised between the substrate and the conductive layer as needed.

In the case of the method of pouring and hardening the ingredient composition, a mold release may be applied to an inner wall of the mold in advance. As the mold release, it is possible to use a known mold release. Examples thereof include a water-based mold release comprising an olefin component and a silicone component and a mold release obtained by dissolving a fluorine component in a fluorine-based solvent. In order to easily form an opening in the outer surface of the conductive layer, the water-based mold release comprising an olefin component and a silicon component is preferably used.

A method of forming the shape of the conductive layer is not particularly limited. Examples thereof include, in addition to the aforementioned method of pouring the ingredient composition into a mold with a predetermined shape, a method of cutting a foam member in a block state (so-called slab foam) into a predetermined dimension through cutting working and then polishing it into a cylindrical shape, a method of molding the ingredient composition into a predetermined dimension with an extruder, and the like.

Developing Apparatus

Figure 2A:
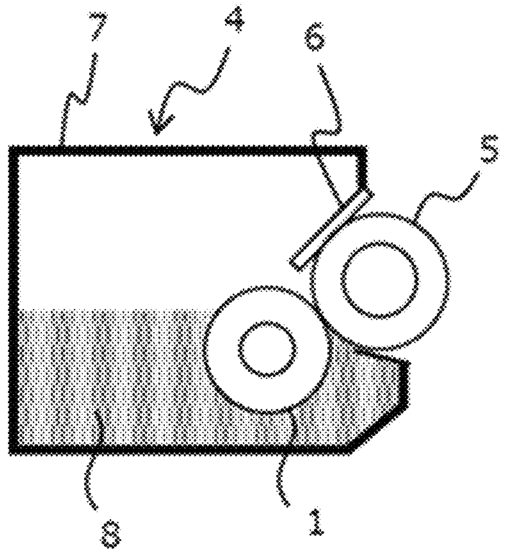
FIGS. 2A and 2B are schematic sectional views of a developing apparatus and a process cartridge.

FIG. 2A illustrates an example of a schematic sectional view of a developing apparatus 4.

The developing apparatus 4 comprises at least a developing roller 5 and a developer feed roller 1 that feeds a developer to the developing roller. Also, the developing apparatus 4 is configured such that a voltage can be applied between the developing roller 5 and the developer feed roller 1.

The developing apparatus 4 has a toner 8 as a developer and comprises an electrophotographic roller to be used as the developer feed roller 1. In other words, the developer feed roller is an electrophotographic roller. Also, the developer feed roller is preferably the above specific electrophotographic roller.

The developing apparatus 4 comprises the developing roller 5 as a developing mechanism and a developing blade 6. The developing apparatus 4 further comprises a toner container 7, and the inside of the toner container 7 is filled with the toner 8. The toner 8 inside the toner container 7 is fed to the surface of the developing roller 5 by the developer feed roller 1, and a layer of the toner 8 with a predetermined thickness is formed on the surface of the developing roller 5 by the developing blade 6.

Other Components of Developing Apparatus

The developing apparatus is not particularly limited as long as the developing apparatus has a configuration comprising the developing roller and the above specific developer feed roller 1. The developing apparatus may comprise components other than the above components. For example, the developing blade 6, the toner container 7, the toner 8, and the like illustrated in FIG. 2A may be comprised, and a developing blade, a toner container, and a toner that are known in the prior art can be used.

Process Cartridge

In another aspect of the present disclosure, a process cartridge configured to be detachably attachable from a main body of an electrophotographic image forming apparatus and comprising the above electrophotographic roller is provided. The process cartridge comprises a contact member that is electrically connected to an electrical contact in the main body of the electrophotographic image forming apparatus when the process cartridge is attached to the main body of the electrophotographic image forming apparatus. The process cartridge is configured such that a voltage can be applied between the developing roller and the developer feed roller through the electrical connection.

The process cartridge preferably comprises the developing apparatus 4 that comprises at least a photosensitive member, a developing roller that transports a toner to the surface of the photosensitive member, and the developer feed roller 1 that feeds a developer to the developing roller.

Figure 2B:
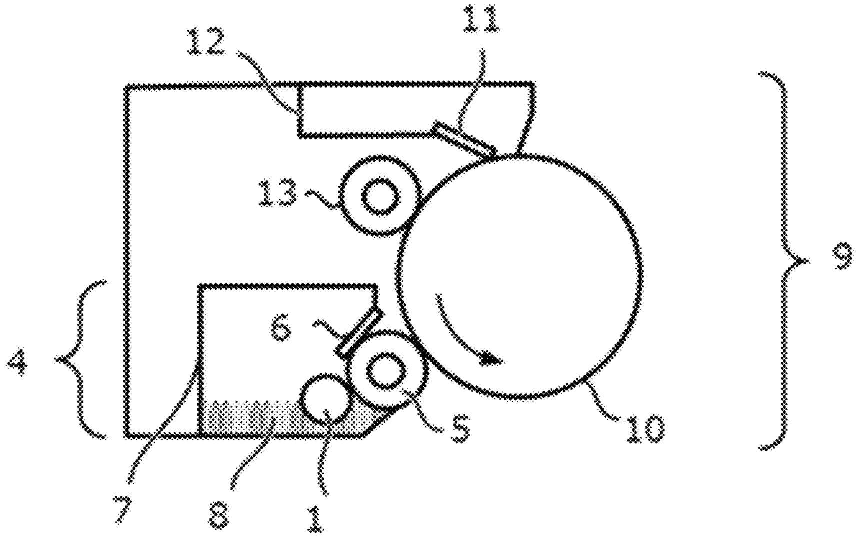

FIG. 2B is a schematic sectional view illustrating an example of the process cartridge. The process cartridge 9 is configured to be detachably attachable from the main body (not illustrated) of the electrophotographic image forming apparatus. Also, the process cartridge 9 comprises the developing apparatus 4, the electrophotographic photosensitive member 10, a cleaning blade 11 as a cleaning mechanism, a waste toner accommodating container 12, and a charging roller 13 as a charging mechanism. Here, the developing apparatus 4 is as illustrated in FIG. 2A and comprises a developing roller and a developer feed roller. The developer feed roller is preferably the above specific electrophotographic roller.

Electrophotographic Image Forming Apparatus

An electrophotographic image forming apparatus according to another aspect of the present disclosure is an electrophotographic image forming apparatus comprising the above electrophotographic roller. The electrophotographic image forming apparatus may be an electrophotographic image forming apparatus comprising the above developing apparatus 4.

Figure 3:
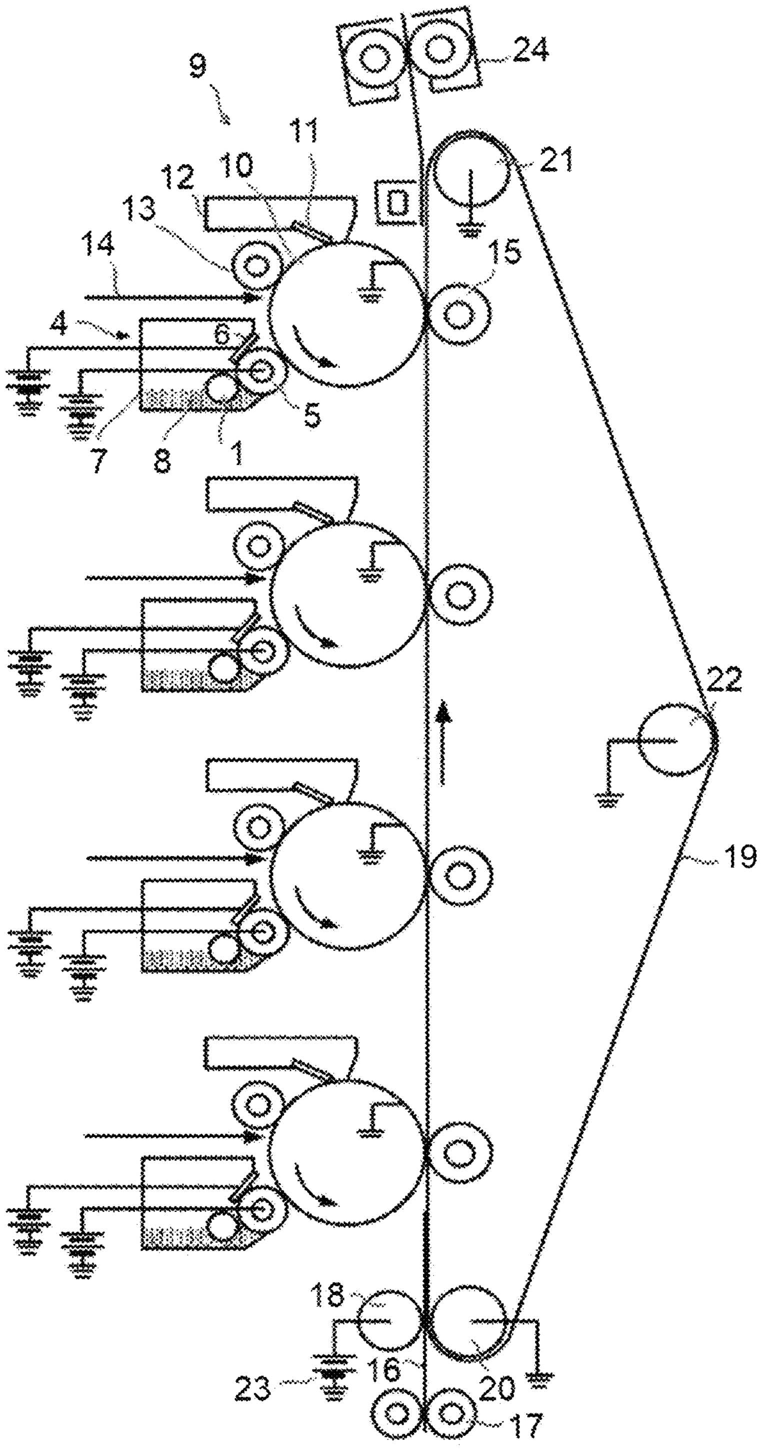
FIG. 3 is a schematic configuration diagram illustrating an electrophotographic image forming apparatus.

FIG. 3 is a schematic sectional view illustrating an example of an electrophotographic image forming apparatus on which a contact-type developing apparatus using a single-component-system developer (toner) is mounted. In FIG. 3, the process cartridge 9 illustrated in FIG. 2B is prepared for each of colors, namely black (Bk), cyan (C), magenta (M), and yellow (Y), and each developing apparatus 4 is filled with the toner 8 of each color such that color printing is possible.

Hereinafter, a printing operation of the electrophotographic image forming apparatus will be described.

The electrophotographic photosensitive member 10 rotates in the arrow direction illustrated in FIG. 3 and is uniformly charged by the charging roller 13 that is for performing charging processing on the electrophotographic photosensitive member 10. Then, an electrostatic latent image is formed on the surface of the electrophotographic photosensitive member 10 with laser light 14 which is an exposure mechanism. The developer feed roller 1 in the developing apparatus 4 supplies the toner 8 to the developing roller 5 disposed to be in contact with the surface of the electrophotographic photosensitive member 10. As a result, the toner 8 is transferred to the surface of the electrophotographic photosensitive member 10, and the electrostatic latent image is thereby visualized (developed) as a toner image.

The developing is so-called reversal developing of forming a toner image on an exposure portion of the electrophotographic photosensitive member 10. The toner image formed on the electrophotographic photosensitive member 10 is transferred to a paper 16 that is a recording medium by a transfer roller 15 that is a transfer member. The paper 16 is fed to the inside of the apparatus through a paper feed roller 17 and an adsorption roller 18 and is transferred to a part between the electrophotographic photosensitive member 10 and the transfer roller 15 by a transfer transport belt 19 with an endless belt shape. The transfer transport belt 19 is operated by a driven roller 20, a driving roller 21, and a tension roller 22. A voltage is applied from a bias power supply 23 to the developing roller 5, the developing blade 6, the developer feed roller 1, and the adsorption roller 18. The paper 16 with the toner image transferred thereto is subjected to fixation processing by a fixing apparatus 24 and is discharged to the outside of the apparatus, and the printing operation is ended. On the other hand, a transfer residual toner remaining on the electrophotographic photosensitive member 10 without being transferred is scraped off by the cleaning blade 11 that is a cleaning member for cleaning the surface of the photosensitive member and is then accommodated in the waste toner accommodating container 12. The cleaned electrophotographic photosensitive member 10 may repeatedly perform the above printing operation.

The electrophotographic image forming apparatus may comprise, for example, the photosensitive member, the developing roller that transports a toner to the surface of the photosensitive member, the developer feed roller that supplies the developer to the surface of the developing roller, and the cleaning roller that cleans the photosensitive member. Also, the above electrophotographic roller is preferably the developer feed roller.

EXAMPLES

The present invention will be described in more detail hereinbelow with reference to Examples and Comparative Examples, but the present invention is not limited by these Examples. Unless otherwise specified, the parts used in the examples are based on mass.

Method of Evaluation Electrophotographic Roller

Method of Measuring Phase Delay θ

Figure 8A:
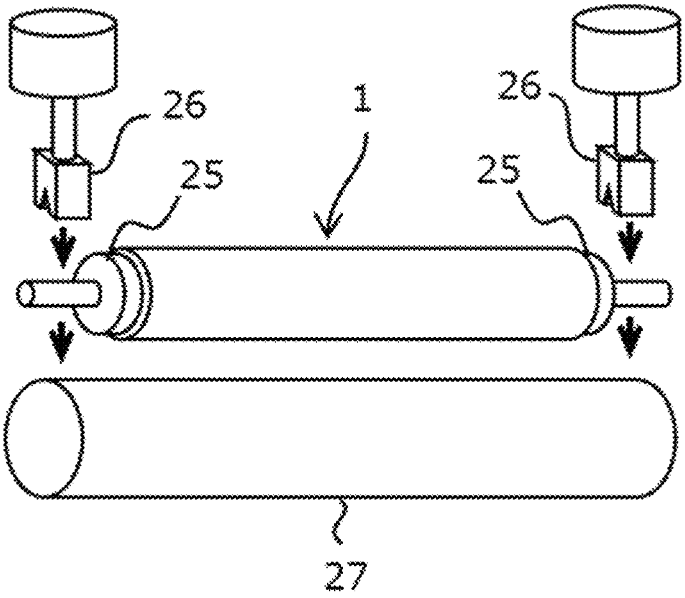
FIGS. 8A and 8B are schematic diagrams illustrating a method of measuring θ using an impedance analyzer.

The θ value was measured in an environment at a temperature of 23° C. and a relative humidity of 52%. As illustrated in FIG. 8A, casters 25 were attached to both end portions of the electrophotographic roller 1, and bearings 26 made of metal were pushed against the casters 25 such that the electrophotographic roller was fixed.

Figure 8B:
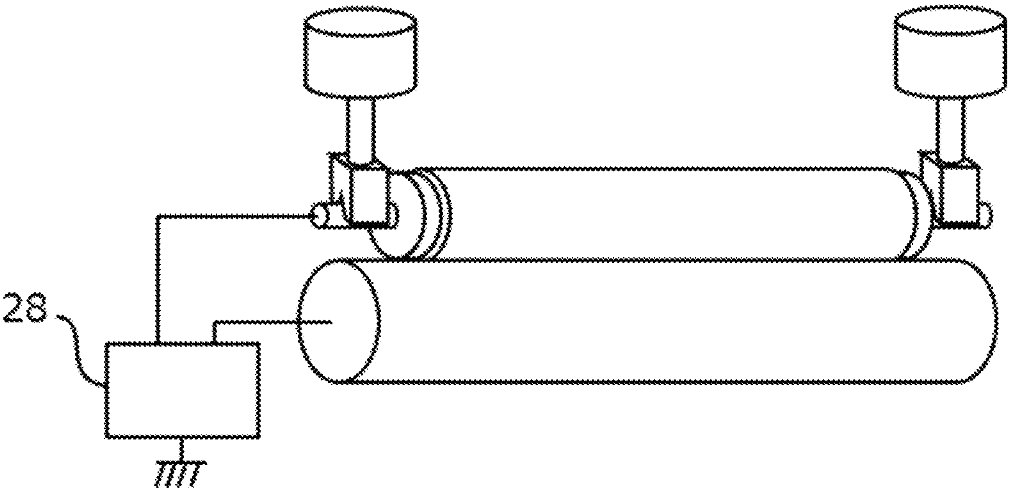

The electrophotographic roller 1 was brought into contact with a metal drum 27 on which hard chrome plating was performed to have surface roughness Ra of 1 μm or less by applying a load of 4.9N for one side. As illustrated in FIG. 8B, electrodes of an impedance analyzer 28 (SOLARTRON 1260A/1296; manufactured by Hokuto Denko Corporation) were connected to a shaft (substrate end portion) of the electrophotographic roller and the metal drum 27.

A DC voltage of 50 V was applied by the impedance analyzer, an AC voltage with an amplitude of 50 V was applied while the AC voltage was changed between the frequencies of $1.0\times10^{-1}$ to $1.0\times10^{5}$ Hz, and the phase delay θ of the impedance was measured. As for measurement frequencies, the measurement was performed at five points for each digit such that the interval of the measurement frequencies was every 1.58489 times between $1.0\times10^{-1}$ to $1.0\times10^{5}$ Hz. A maximum value of the absolute values θ obtained in the frequency range of $1.0\times10^{-1}$ to $1.0\times10^{1}$ Hz (that is, the absolute value of θ when the phase delay was the maximum) was defined as max|θ| and was defined as an absolute value of the phase delay θ.

Method of Measuring Initial Resistance Value of Electrophotographic Roller

Figure 9A:
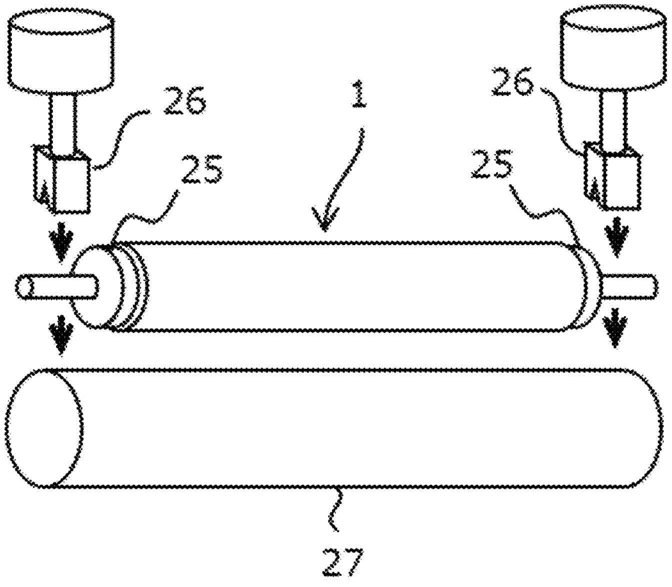
FIGS. 9A and 9B are schematic diagrams illustrating a method of measuring electric conduction degradation.
Figure 9B:
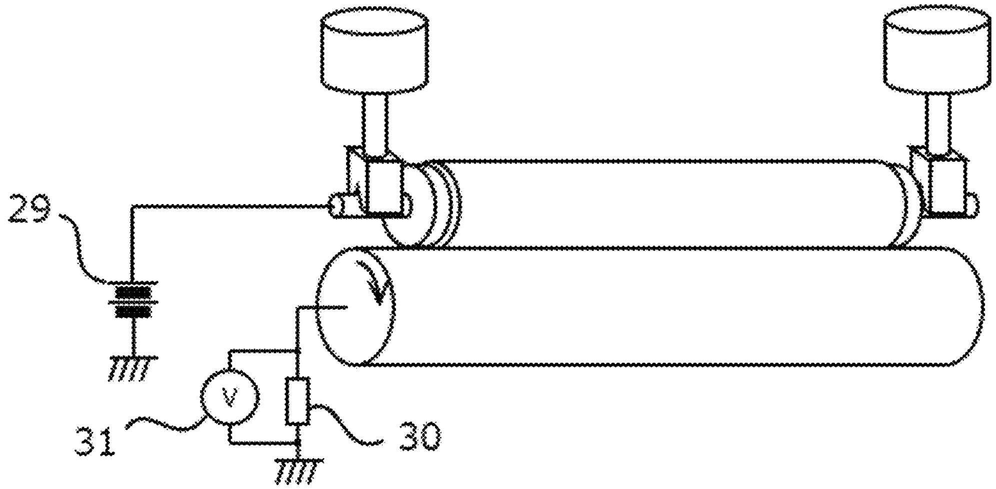

An initial resistance value of the electrophotographic roller was measured in an environment at a temperature of 23° C. and a relative humidity of 52%. As illustrated in FIG. 9A, the electrophotographic roller 1 was brought into contact with the metal drum 27. The casters 25 were fitted to the substrate end portions of the electrophotographic roller 1, both the substrate end portions were pressed by the bearings 26 made of metal to apply a load of 4.9N for one side to the metal drum and to thereby cause the electrophotographic roller to be brought into contact with the metal drum. A power supply 29, a resistance 30, and a voltmeter 31 were connected to the shaft of the electrophotographic roller (the substrate end portions) and the metal drum 27 as illustrated in FIG. 9B. A voltage of 200 V was applied while the metal drum was caused to rotate at 30 rpm in the direction of the arrow in FIG. 9B, a voltage from two seconds to five seconds after the start of the application of the voltage was recorded at 100 Hz using a data logger (not illustrated) connected to the voltmeter 31, and an initial resistance value (Q) of the electrophotographic roller was obtained from an average voltage thereof.

Method of Evaluation Power Distribution Degradation

The electrophotographic roller after the initial resistance value was measured by the aforementioned method was used, and an apparatus that is similar to that for the measurement of the initial resistance value was used to measure the resistance value after rotation with electric conduction for 12 hours and to thereby evaluate electric conduction degradation.

The electrophotographic roller after the initial resistance value was measured was brought into contact with the metal drum as illustrated in FIG. 9A in an environment at a temperature of 23° C. and a relative humidity of 52%. The casters were fitted to the substrate end portions, and both the substrate end portions were pushed with the bearings made of metal to apply a load of 4.9N for one side to the metal drum and to thereby cause the electrophotographic roller to be brought into contact with the metal drum. A power supply, a resistance, and a voltmeter were connected to the shaft of the electrophotographic roller (substrate end portions) and the metal drum as illustrated in FIG. 9B. The metal drum was made to rotate at 30 rpm in the direction of the arrow in FIG. 9B, and rotation with electric conduction for 12 hours was performed while a voltage of 200 V was applied.

A voltage from two seconds to five seconds after the timing of the end of the rotation with electric conduction was recorded at 100 Hz, and a resistance value (Ω) after electric conduction of the electrophotographic roller was obtained from an average voltage thereof. A value of a ratio of the initial resistance value with respect to the thus obtained resistance value after electric conduction (value of resistance value after electric conduction/initial resistance value) was defined as a resistance change rate and was evaluated as an index of electric conduction degradation. A higher resistance change rate indicated a higher resistance value after electric conduction over a long period of time and occurrence of electric conduction degradation.

Method of Measuring Porosity

As for the porosity of the conductive layer of the electrophotographic roller, the porosity of the conductive layer of the electrophotographic roller was measured using a three-dimensional measurement X-ray CT apparatus (TDM 1001-DD; manufactured by Yamato Scientific Co., Ltd.).

The electrophotographic roller was cut into a cylindrical shape with the length of 10 mm together with the substrate, and a three-dimensional image was obtained using the above three-dimensional measurement X-ray CT apparatus. The porosity was obtained from the obtained three-dimensional image using Equation (1) below. Note the measurement conditions were as follows.

Target material: tungsten, Filament material: tungsten, X-ray intensity: 100 Kv $$\text{Porosity (\% by volume)} = \text{volume of void}/(\text{volume of cylinder} - \text{volume of substrate}) \quad \text{(Equation (1))}$$

Method of Measuring Average Elastic Modulus Using SPM

A section of the conductive layer of the electrophotographic roller was cut into and extracted as a thin piece using a diamond knife in a state in which the electrophotographic roller was held at −110° C. using a cryomicrotome (product name: EMFC 6, manufactured by Leica Microsystems). Furthermore, a measurement region with a side of 100 μm and at 100 μm in the depth direction from the surface of the thin piece was extracted from the thin piece, to thereby produce a sample. An elastic modulus of the surface of the inner wall of the skeleton comprising polyurethane as a binder was measured. For the measurement, an SPM apparatus (product name: MFP-3D-Origin, manufactured by Oxford Instruments) and a probe (product name: AC 160, manufactured by Olympus Corporation) were used. At this time, force curves were measured five locations in the vertical direction×five locations in the horizontal direction, namely total of 25 times, an arithmetic mean of 23 points except for the highest value and the lowest value was obtained, and an average elastic modulus was calculated on the basis of the Hertz theory.

Method of Specifying Each Component in Conductive Layer

The dispersant such as a nonionic surfactant comprised in the conductive layer was able to be extracted from the conductive layer using a solvent such as acetone, methyl ethyl ketone, or tetrahydrofuran.

The extracted nonionic surfactant was dissolved in a solvent such as deuterochloroform or deuteroacetone, and the type of the dispersant comprised in the conductive layer was able to be specified using nuclear magnetic resonance (NMR) or gel permeation chromatography (GPC).

Also, the electron conductive filler comprised in the conductive layer can be separated from the conductive layer by heating the conductive layer to 500° C. in a nitrogen atmosphere and thermally decomposing the binder resin. The residues after the above thermal decomposition were the electron conductive filler comprised in the conductive layer. Components of the electron conductive filler separated from the conductive layer were able to be specified through various kinds of chemical analysis such as nuclear magnetic resonance (NMR).

Method of Measuring Content of Electron Conductive Filler in Conductive Layer

When the content of the electron conductive filler in the conductive layer was obtained from the electrophotographic roller, the following method was able to be used.

The conductive layer was extracted and removed from the substrate, the mass was measured, and the conductive layer was then heated at 500° C. in a nitrogen atmosphere, thereby thermally decomposing the binder resin. Thereafter, residues of the conductive particle were collected, and the mass was measured. (Mass of residues of conductive particle/mass of conductive layer)×100 was defined as the content of the electron conductive filler in the conductive layer.

Materials of Electrophotographic Rollers

Used materials for the electrophotographic rollers are described in Tables 1 and 2.

TABLE 1

| Abbreviation | Materials |
|---|---|
| E-1 | Polyethylene glycol alkyl ether dispersion of single-wall carbon nanotubes (10% by mass of carbon nanotube) (Product name: “TUBALL MTRIX 301”; manufactured by OCSiAl) |
| E-2 | Aliphatic carboxylic acid derivative dispersion of single-wall carbon nanotubes (10% by mass of carbon nanotube) (Product name: “TUBAL MTRIX 202”; manufactured by OCSiAl) |
| E-3 | Single-wall carbon nanotubes (Product name: “TUBALL”; manufactured by OCSiAl) |
| E-4 | Single-wall carbon nanotubes (Product name: “ZEONANO SG101”' manufactured by Zeon Corporation) |
| E-5 | Carbon black (Product name: “KETJEN BLACK EC300J”; manufactured by Lion Specialty Chemicals Co., Ltd.) |
| E-6 | Graphite powder (Product name: “GRAPHITE (POWDER)”; manufactured by Kishida Chemical Co., Ltd.) |
| E-7 | Conductive tin oxide powder (Product name: “SP-2”; manufactured by Mitsubishi Materials Electronic Chemicals Co., Ltd.) |
| E-8 | Ultrafine powder nickel (nickel powder) (Product of 400 μm; manufactured by Toho Titanium Co., Ltd.) |
| E-9 | Multi-wall carbon nanotube (Product name: “NTF01”; manufactured by Koatsu Gas Kogyo Co., Ltd.) |
| I-1 | Lithium perchlorate (anhydrous) (Product name: “LITHIUM PERCHLORATE (ANHYDROUS)”; manufactured by Kishida ChemicalCo., Ltd.) |
| I-2 | Lithium bis(trifluoromethanesulfonyl) imide (Product name: EF-N115 (Li-TFSI)”; manufactured by Mitsubishi Materials Electronics Chemicals Co., Ltd.) |

TABLE 2

| Abbreviation | Material |
|---|---|
| P-1 | Polyethylene propylene ether triol with number average molecular weight of 3100 (Product name “ACTOCOL EP-550N”; manufactured by Mitsui Chemicals, Inc.) |
| P-2 | Polyethylene propylene ether triol with number average molecular weight of 5000 (Product name “ACTOCOL EP-950P”; manufactured by Mitsui Chemicals, Inc.) |
| P-3 | Polyethylene propylene ether triol with number average molecular weight of 3000 (Product name “ACTOCOL EP-505S”; manufactured by Mitsui Chemicals, Inc.) |
| N-1 | Isocyanate admixture (NCO % = 44.5, MDI = 20% contained) (Product name: “COSMONATE TM20”; manufactured by Mitsui Chemicals, Inc.) |
| N-2 | Isocyanate admixture (NCO % = 39.5, MDI = 50% contained) (Product name: “COSMONATE TM50”; manufactured by Mitsui Chemicals, Inc.) |
| D-1 | Potassium oleate (Reagent; manufactured by Tokyo Chemical Industry Co., Ltd.) |
| D-2 | Polyethylene glycol monolauryl ether (Reagent; manufactured by Tokyo Chemical Industry Co., Ltd.) |
| W | Ion exchange water |
| S-1 | Silicone foam stabilizer (Product name: “SRX274C”; manufactured by Dow Corning Toray Co., Ltd.) |
| C-1 | N-methylmorpholine (Product name: “N-METHYLMORPHOLINE (N-MM)”; manufactured by Nippon Nyukazai Co., Ltd.) |
| C-2 | Amine catalyst (Product name: “DABCO 33-LV”; manufactured by Evonik Japan |

Example 1

Figure 10A:
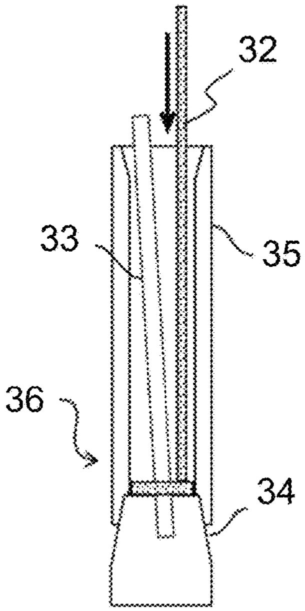
FIGS. 10A to 10C are schematic sectional views illustrating a forming method for a conductive layer of an electrophotographic roller.
Figure 10B:
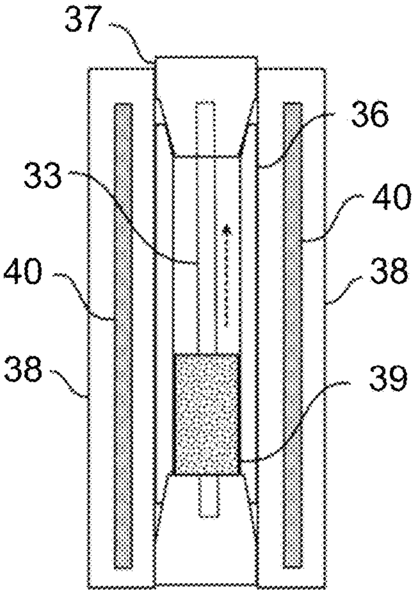
Figure 10C:
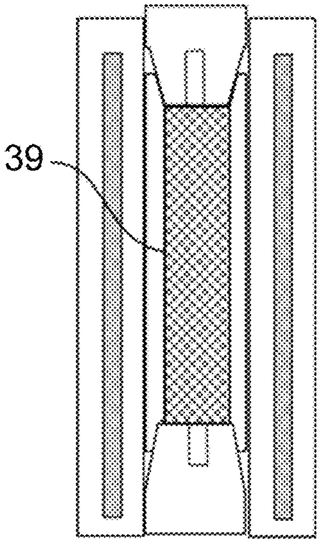

As illustrated in FIGS. 10A to 10C, a mold 36 including a cylindrical member (pipe mold 35) with an inner surface coated with a release agent, an upper piece member 37, and a lower piece member 34 and a substrate 33 were prepared.

As the substrate 33, a substrate obtained by performing electroless nickel plating on iron (material name: SUM24) with an outer diameter of 5 mm and a length of 272 mm was used. As the mold 36, a cylindrical mold with a cavity inner diameter of 11.00 mm and a cavity length of 220 mm was used. For mold releasing processing for the mold 36, the lower piece member 34, and the upper piece member 37, a release agent (product name: FRELEASE 690 manufactured by Neos Company Limited) was used. The mold releasing processing was performed by preheating the mold 36, the lower piece member 34, and the upper piece member 37 to 75° C. in advance.

The following materials (1), (2), and (3) were weighed in a container and were stirred and mixed at 3000 rpm for 20 minutes using HOMODISPER 2.5 type (manufactured by Primix Corporation).

(1): First electron conductive filler E-1: 0.5 parts by mass
(2): Polyol P-1: 90.0 parts by mass
(3): Polyol P-3: 10.0 parts by mass Furthermore, the following materials (4), (5), (6), and (7) were added to the container and were stirred and mixed at 1500 rpm for 5 minutes using HOMODISPER 2.5 type, thereby obtaining a polyol mixture.

(4): Foaming agent W: 1.5 parts by mass
(5): Foam stabilizer S-1: 0.4 parts by mass
(6): Catalyst C-1: 1.0 parts by mass
(7): Catalyst C-2: 0.5 parts by mass A liquid obtained by adding 24.7 parts by mass of isocyanate compound (N-1) to the above polyol mixture, adjusting the liquid temperature to 26° C., and mixing and stirring the liquid with a casting machine was used as a conductive layer forming material. Note that the mixing of the polyol mixture and the isocyanate compound was performed immediately before pouring into a mold.

As illustrated in FIG. 10A, 2.3 g of conductive layer forming material 32 was poured into the mold 36 in which the lower piece member 34 with the substrate 33 placed thereon and the pipe mold 35 were combined. Note that the substrate and the lower piece member were preheated to 70° C. in advance.

The pouring of the conductive layer forming material was performed in a state in which the substrate inside the mold 36 was obliquely inclined with deviation of 3 mm on the side opposite to the injection side from the center position of the mold at an upper end position (FIG. 10A). As illustrated in FIG. 10B, a state in which the upper piece member 37 preheated to 75° C. in advance was fitted to the mold 36 was achieved after the conductive layer forming material was poured, heating was continued by bringing a hot plate 38 incorporating heater 40 into close contact, and heating and curing were performed at 75° C. for 8 minutes.

During the heating and curing, the conductive layer forming material 39 foaming in the mold expanded and spread to the entire space in the mold as illustrated in FIG. 10C when the heating ended. Thereafter, a resin was cured, and the conductive layer of the electrophotographic roller was formed. The upper piece member and the lower piece member were detached and removed from the mold after the heating and curing ended, and the electrophotographic roller including the substrate and the conductive layer was extracted.

An electrophotographic roller A-1 in Example 1 was formed by the above method.

Examples 2 to 19, 38, 40 to 43, and 50 to 52

Electrophotographic rollers A-2 to A-19, A-38, A-40 to A-43, and A-50 to A-52 in Examples 2 to 19, 38, 40 to 43, and 50 to 52 were obtained similarly to the method of manufacturing the electrophotographic roller A-1 other than that the amount of incorporated first electron conductive filler, the type of polyol, the type and the amount of incorporated isocyanate, and the amount of foaming agent were changed as shown in Tables 3, 6, and 7.

Table 3 shows composition of conductive layer forming materials used for the electrophotographic rollers A-1 to A-19. Table 6 shows composition of conductive layer forming materials used for the electrophotographic roller A-38. Table 7 shows composition of conductive layer forming materials used for the electrophotographic rollers A-40 to A-43 and A-50 to A-52.

TABLE 3

| | Roller | Incorporated materials | | | | | | | | | |
|---|---|---|---|---|---|---|---|---|---|---|---|
| | | Electron conductive filler | Polyol | | | Isocyanate | | Foaming agent | Foam stabilizer | Catalyst | |
| | No. | E-1 | P-1 | P-2 | P-3 | N-1 | N-2 | W | S-1 | C-1 | C-2 |
| Example 1 | A-1 | 0.5 | 90 | 0 | 10 | 24.7 | 0 | 1.5 | 0.4 | 1 | 0.5 |
| Example 2 | A-2 | 0.01 | 90 | 0 | 10 | 24.7 | 0 | 1.5 | 0.4 | 1 | 0.5 |
| Example 3 | A-3 | 0.03 | 90 | 0 | 10 | 24.7 | 0 | 1.5 | 0.4 | 1 | 0.5 |
| Example 4 | A-4 | 0.1 | 90 | 0 | 10 | 24.7 | 0 | 1.5 | 0.4 | 1 | 0.5 |
| Example 5 | A-5 | 1 | 90 | 0 | 10 | 24.7 | 0 | 1.5 | 0.4 | 1 | 0.5 |
| Example 6 | A-6 | 3 | 90 | 0 | 10 | 24.7 | 0 | 1.5 | 0.4 | 1 | 0.5 |
| Example 7 | A-7 | 8 | 90 | 0 | 10 | 24.7 | 0 | 1.5 | 0.4 | 1 | 0.5 |
| Example 8 | A-8 | 0.05 | 90 | 0 | 10 | 23.4 | 0 | 1.5 | 0.4 | 1 | 0.5 |
| Example 9 | A-9 | 0.5 | 90 | 0 | 10 | 23.4 | 0 | 1.5 | 0.4 | 1 | 0.5 |
| Example 10 | A-10 | 0.5 | 90 | 0 | 10 | 25.9 | 0 | 1.5 | 0.4 | 1 | 0.5 |
| Example 11 | A-11 | 2 | 90 | 0 | 10 | 25.9 | 0 | 1.5 | 0.4 | 1 | 0.5 |
| Example 12 | A-12 | 0.05 | 0 | 90 | 10 | 21.5 | 0 | 1.5 | 0.4 | 1 | 0.5 |
| Example 13 | A-13 | 0.5 | 0 | 90 | 10 | 21.5 | 0 | 1.5 | 0.4 | 1 | 0.5 |
| Example 14 | A-14 | 0.5 | 90 | 0 | 10 | 0 | 27.8 | 1.5 | 0.4 | 1 | 0.5 |
| Example 15 | A-15 | 2 | 90 | 0 | 10 | 0 | 27.8 | 1.5 | 0.4 | 1 | 0.5 |
| Example 16 | A-16 | 0.5 | 90 | 0 | 10 | 21.5 | 0 | 1.2 | 0.4 | 1 | 0.5 |
| Example 17 | A-17 | 0.5 | 90 | 0 | 10 | 26.3 | 0 | 1.65 | 0.4 | 1 | 0.5 |
| Example 18 | A-18 | 0.5 | 90 | 0 | 10 | 21 | 0 | 1.15 | 0.4 | 1 | 0.5 |
| Example 19 | A-19 | 0.5 | 90 | 0 | 10 | 26.8 | 0 | 1.7 | 0.4 | 1 | 0.5 |

Table 4 shows physical properties and evaluation results of the electrophotographic rollers A-1 to A-19.

TABLE 4

| | Roller No. | max\|θ\| degrees | SPM hardness Mpa | Porosity % by volume | Resistance value Initial Ω | after electric conduction Ω | Resistance change rate |
|---|---|---|---|---|---|---|---|
| Example 1 | A-1 | 1.0 | 1508 | 85 | 8.01E+08 | 8.47E+08 | 1.06 |
| Example 2 | A-2 | 3.0 | 1548 | 86 | 5.64E+09 | 2.97E+10 | 5.26 |
| Example 3 | A-3 | 1.5 | 1501 | 86 | 3.41E+09 | 6.46E+09 | 1.89 |
| Example 4 | A-4 | 1.2 | 1540 | 85 | 2.21E+09 | 3.03E+09 | 1.37 |
| Example 5 | A-5 | 1.0 | 1543 | 85 | 5.13E+08 | 5.42E+08 | 1.06 |
| Example 6 | A-6 | 1.0 | 1625 | 84 | 2.35E+08 | 2.48E+08 | 1.06 |

TABLE 4-continued

| | Roller No. | max\|θ\| degrees | SPM hardness Mpa | Porosity % by volume | Resistance value Initial Ω | Resistance value after electric conduction Ω | Resistance change rate |
|---|---|---|---|---|---|---|---|
| Example 7 | A-7 | 1.0 | 1826 | 84 | 7.96E+07 | 8.39E+07 | 1.05 |
| Example 8 | A-8 | 1.4 | 1413 | 84 | 3.38E+09 | 5.80E+09 | 1.72 |
| Example 9 | A-9 | 1.0 | 1401 | 84 | 6.99E+08 | 7.44E+08 | 1.06 |
| Example 10 | A-10 | 1.0 | 1609 | 86 | 9.37E+08 | 1.00E+09 | 1.07 |
| Example 11 | A-11 | 1.0 | 1761 | 86 | 4.99E+08 | 5.37E+08 | 1.08 |
| Example 12 | A-12 | 1.4 | 1450 | 85 | 3.43E+09 | 5.87E+09 | 1.71 |
| Example 13 | A-13 | 1.0 | 1426 | 85 | 7.02E+08 | 7.57E+08 | 1.08 |
| Example 14 | A-14 | 1.0 | 1514 | 86 | 7.18E+08 | 7.75E+08 | 1.08 |
| Example 15 | A-15 | 1.0 | 1605 | 86 | 2.62E+08 | 2.82E+08 | 1.07 |
| Example 16 | A-16 | 2.0 | 1432 | 50 | 1.22E+09 | 3.55E+09 | 2.91 |
| Example 17 | A-17 | 1.0 | 1640 | 97 | 4.08E+08 | 4.36E+08 | 1.07 |
| Example 18 | A-18 | 2.0 | 1449 | 48 | 1.02E+09 | 2.99E+09 | 2.93 |
| Example 19 | A-19 | 1.0 | 1621 | 96 | 4.48E+08 | 4.86E+08 | 1.08 |

In the table, max|θ| indicates absolute values of phase delays θ. The SPM hardness indicates average elastic modulus measured using an SPM. In the table, the description of 8.01E+08 indicates $8.01\times10^8$, for example.

Example 20

The following materials (1), (2), (3), and (4) were weighed in a container and were stirred and mixed at 3000 rpm for 20 minutes using HOMODISPER 2.5 type (manufactured by Primix Corporation).

(1): First electron conductive filler E-1: 0.01 parts by mass
(2): Second electron conductive filler E-5: 0.5 parts by mass
(3): Polyol P-1: 90.0 parts by mass
(4): Polyol P-3: 10.0 parts by mass Furthermore, the following materials (5), (6), (7), and (8) were added to the container and were stirred and mixed at 1500 rpm for 5 minutes using HOMODISPER 2.5 type, thereby obtaining a polyol mixture.

(5): Foaming agent W: 1.5 parts by mass
(6): Foam stabilizer S-1: 0.4 parts by mass
(7): Catalyst C-1: 1.0 parts by mass
(8): Catalyst C-2: 0.5 parts by mass To the above polyol mixture, 24.7 parts by mass of isocyanate compound (N-1) was added, thereby obtaining a conductive layer forming material. The thus obtained conductive layer forming material was molded similarly to the electrophotographic roller A-1 in Example 1, thereby forming an electrophotographic roller A-20 in Example 20.

Examples 21 to 31, 39, 44 to 49, 53, and 54

Electrophotographic rollers A-21 to A-31, A-39, A-44 to A-49, A-53, and A-54 in Examples 21 to 31, 39, 44 to 49, 53, and 54 were formed similarly to the method of manufacturing the electrophotographic roller A-20 other than that the type and the amount of incorporated first electron conductive filler and the type and the amount of incorporated second electron conductive filler were changed as shown in Tables 5 and 7.

Example 32

The following materials (1), (2), (3), and (4) were weighed in a container and were stirred and mixed at 3000 rpm for 20 minutes using HOMODISPER 2.5 type (manufactured by Primix Corporation).

(1) First electron conductive filler E-4: 0.005 parts by mass
(2): Polyol P-1: 90.0 parts by mass
(3): Polyol P-3: 10.0 parts by mass
(4): Dispersant D-2: 0.045 parts by mass Furthermore, the following materials (5), (6), (7), and (8) were added to the container and were stirred and mixed at 1500 rpm for 5 minutes using HOMODISPER 2.5 type, thereby obtaining a polyol mixture.

(5): Foaming agent W: 1.5 parts by mass
(6): Foam stabilizer S-1: 0.4 parts by mass
(7): Catalyst C-1: 1.0 parts by mass
(8): Catalyst C-2: 0.5 parts by mass To the above polyol mixture, 24.7 parts by mass of isocyanate compound (N-1) was added, thereby obtaining a conductive layer forming material. The thus obtained conductive layer forming material was molded similarly to the electrophotographic roller A-1 in Example 1, thereby forming an electrophotographic roller A-32 in Example 32.

Examples 33 and 34

Electrophotographic rollers A-33 and A-34 in Examples 33 and 34 were formed by changing the amount of incorporated first electron conductive filler and the amount of incorporated dispersant from those of the electrophotographic roller A-32 in Example 32.

Example 35

The following materials (1), (2), (3), (4), and (5) were weighed in a container and were stirred and mixed at 3000 rpm for 20 minutes using HOMODISPER 2.5 type (manufactured by Primix Corporation).

(1): First electron conductive filler E-4: 0.05 parts by mass
(2): Second electron conductive filler E-5: 1.0 parts by mass
(3): Polyol P-1: 90.0 parts by mass
(4): Polyol P-3: 10.0 parts by mass
(5): Dispersant D-2: 0.45 parts by mass Furthermore, the following materials (6), (7), (8), and (9) were added to the container and stirred and mixed at 1500 rpm for 5 minutes using HOMODISPER 2.5 type, thereby obtaining a polyol mixture.

(6): Foaming agent W: 1.5 parts by mass (7): Foam stabilizer S-1: 0.4 parts by mass (8): Catalyst C-1: 1.0 parts by mass (9): Catalyst C-2: 0.5 parts by mass To the above polyol mixture, 24.7 parts by mass of isocyanate compound (N-1) was added, thereby obtaining a conductive layer forming material. The thus obtained conductive layer forming material was molded similarly to the electrophotographic roller A-1 in Example 1, thereby forming an electrophotographic roller A-35 in Example 35.

Examples 36 and 37

Electrophotographic rollers A-36 and A-37 in Examples 36 and 37 were obtained similarly to the method of manufacturing the electrophotographic roller A-35 other than that the type and the amount of incorporated first electron conductive filler, the type and the amount of incorporated second electron conductive filler, and the amount of incorporated dispersant were changed as shown in Table 5.

Table 5 shows incorporating of conductive layer forming materials used for the electrophotographic rollers A-20 to A-39.

TABLE 5

| | Roller | Incorporated materials | | | | | | | | | | | |
|---|---|---|---|---|---|---|---|---|---|---|---|---|---|
| | | First electron conductive filler | | Second electron conductive filler | | Dispersant | Polyol | | Isocyanate | Foaming agent | Foam stabilizer | Catalyst | |
| | No. | Type | Amount | Type | Amount | D-2 | P-1 | P-3 | N-1 | W | S-1 | C-1 | C-2 |
| Example 20 | A-20 | E-1 | 0.01 | E-5 | 0.5 | 0 | 90 | 10 | 24.7 | 1.5 | 0.4 | 1 | 0.5 |
| Example 21 | A-21 | E-1 | 0.01 | E-5 | 4.95 | 0 | 90 | 10 | 24.7 | 1.5 | 0.4 | 1 | 0.5 |
| Example 22 | A-22 | E-1 | 0.01 | E-5 | 4.99 | 0 | 90 | 10 | 24.7 | 1.5 | 0.4 | 1 | 0.5 |
| Example 23 | A-23 | E-1 | 0.1 | E-5 | 0.001 | 0 | 90 | 10 | 24.7 | 1.5 | 0.4 | 1 | 0.5 |
| Example 24 | A-24 | E-1 | 0.1 | E-5 | 1 | 0 | 90 | 10 | 24.7 | 1.5 | 0.4 | 1 | 0.5 |
| Example 25 | A-25 | E-1 | 0.5 | E-5 | 0.5 | 0 | 90 | 10 | 24.7 | 1.5 | 0.4 | 1 | 0.5 |
| Example 26 | A-26 | E-1 | 0.5 | E-5 | 4.95 | 0 | 90 | 10 | 24.7 | 1.5 | 0.4 | 1 | 0.5 |
| Example 27 | A-27 | E-1 | 8 | E-5 | 0.001 | 0 | 90 | 10 | 24.7 | 1.5 | 0.4 | 1 | 0.5 |
| Example 28 | A-28 | E-1 | 8 | E-5 | 1 | 0 | 90 | 10 | 24.7 | 1.5 | 0.4 | 1 | 0.5 |
| Example 29 | A-29 | E-1 | 0.5 | E-6 | 0.5 | 0 | 90 | 10 | 24.7 | 1.5 | 0.4 | 1 | 0.5 |
| Example 30 | A-30 | E-1 | 0.5 | E-7 | 1 | 0 | 90 | 10 | 24.7 | 1.5 | 0.4 | 1 | 0.5 |
| Example 31 | A-31 | E-1 | 0.5 | E-8 | 4.95 | 0 | 90 | 10 | 24.7 | 1.5 | 0.4 | 1 | 0.5 |
| Example 32 | A-32 | E-4 | 0.005 | — | 0 | 0.045 | 90 | 10 | 24.7 | 1.5 | 0.4 | 1 | 0.5 |
| Example 33 | A-33 | E-4 | 0.05 | — | 0 | 0.45 | 90 | 10 | 24.7 | 1.5 | 0.4 | 1 | 0.5 |
| Example 34 | A-34 | E-4 | 0.2 | — | 0 | 1.8 | 90 | 10 | 24.7 | 1.5 | 0.4 | 1 | 0.5 |
| Example 35 | A-35 | E-4 | 0.05 | E-5 | 1.0 | 0.45 | 90 | 10 | 24.7 | 1.5 | 0.4 | 1 | 0.5 |
| Example 36 | A-36 | E-4 | 0.05 | E-5 | 0.5 | 0.45 | 90 | 10 | 24.7 | 1.5 | 0.4 | 1 | 0.5 |
| Example 37 | A-37 | E-4 | 0.8 | E-5 | 6 | 7.2 | 90 | 10 | 24.7 | 1.5 | 0.4 | 1 | 0.5 |
| Example 38 | A-38 | E-5 | 10 | — | 0 | 0 | 90 | 10 | 24.7 | 1.5 | 0.4 | 1 | 0.5 |
| Example 39 | A-39 | E-1 | 0.05 | E-5 | 6 | 0 | 90 | 10 | 24.7 | 1.5 | 0.4 | 1 | 0.5 |

Table 6 shows physical properties and evaluation results of the electrophotographic rollers A-20 to A-39.

TABLE 6

| | Roller No. | max\|θ\| degrees | SPM hardness Mpa | Porosity % by volume | Resistance value: Initial Ω | Resistance value: after electric conduction Ω | Resistance change rate |
|---|---|---|---|---|---|---|---|
| Example 20 | A-20 | 2.8 | 1869 | 86 | 6.12E+09 | 2.91E+10 | 4.75 |
| Example 21 | A-21 | 2.6 | 3423 | 86 | 7.32E+08 | 3.12E+09 | 4.26 |
| Example 22 | A-22 | 2.6 | 3434 | 86 | 7.23E+08 | 3.08E+09 | 4.26 |
| Example 23 | A-23 | 1.1 | 1556 | 85 | 2.26E+09 | 2.73E+09 | 1.21 |
| Example 24 | A-24 | 1.0 | 1949 | 85 | 1.90E+09 | 2.01E+09 | 1.06 |
| Example 25 | A-25 | 1.0 | 1844 | 85 | 7.76E+08 | 8.22E+08 | 1.06 |
| Example 26 | A-26 | 1.0 | 3503 | 85 | 5.97E+08 | 6.32E+08 | 1.06 |
| Example 27 | A-27 | 1.0 | 1808 | 84 | 7.99E+07 | 8.45E+07 | 1.06 |
| Example 28 | A-28 | 1.0 | 2057 | 84 | 7.83E+07 | 8.27E+07 | 1.06 |
| Example 29 | A-29 | 2.2 | 2054 | 84 | 6.22E+08 | 2.07E+09 | 3.33 |
| Example 30 | A-30 | 2.2 | 2231 | 86 | 7.86E+08 | 2.61E+09 | 3.33 |
| Example 31 | A-31 | 2.2 | 2996 | 86 | 7.95E+08 | 2.65E+09 | 3.33 |
| Example 32 | A-32 | 1.4 | 1536 | 86 | 2.91E+09 | 4.99E+09 | 1.71 |
| Example 33 | A-33 | 1.0 | 1543 | 85 | 7.77E+08 | 8.28E+08 | 1.07 |
| Example 34 | A-34 | 1.0 | 1519 | 84 | 3.13E+08 | 3.33E+08 | 1.06 |
| Example 35 | A-35 | 1.0 | 2025 | 85 | 7.22E+08 | 7.67E+08 | 1.06 |
| Example 36 | A-36 | 1.0 | 1957 | 85 | 7.50E+08 | 7.96E+08 | 1.06 |
| Example 37 | A-37 | 1.0 | 5289 | 86 | 5.93E+07 | 6.35E+07 | 1.07 |
| Example 38 | A-38 | 9.3 | 4626 | 86 | 9.23E+08 | 2.63E+10 | 28.51 |
| Example 39 | A-39 | 9.8 | 3816 | 85 | 9.01E+08 | 2.78E+10 | 30.84 |

Comparative Examples 1 and 2

The following materials (1), (2), and (3) were weighed in a container and were stirred and mixed at 3000 rpm for 20 minutes using HOMODISPER 2.5 type (manufactured by Primix Corporation).

(1): First electron conductive filler I-1: 2.0 parts by mass (2): Polyol P-1: 90.0 parts by mass (3): Polyol P-3: 10.0 parts by mass Furthermore, the following materials (4), (5), (6), and (7) were added to the container and were stirred and mixed at 1500 rpm for 5 minutes using HOMODISPER 2.5 type, thereby obtaining a polyol mixture.

(4) Foaming agent W: 1.5 parts by mass (5) Foam stabilizer S-1: 0.4 parts by mass (6) Catalyst C-1: 1.0 parts by mass (7) Catalyst C-2: 0.5 parts by mass.

To the above polyol mixture, 24.7 parts by mass of isocyanate compound (N-1) was added, thereby obtaining a conductive layer forming material. The thus obtained conductive layer forming material was molded similarly to the electrophotographic roller A-1 in Example 1, thereby forming an electrophotographic roller B-1 in Comparative Example 1. Also, the type and the amount of first electron conductive filler to be incorporated were changed from those of the electrophotographic roller B-1 in Comparative Example 1, thereby obtaining an electrophotographic roller B-2 in Comparative Example 2.

Comparative Examples 3 and 4

The following materials (1), (2), (3), and (4) were weighed in a container and were stirred and mixed at 3000 rpm for 20 minutes using HOMODISPER 2.5 type (manufactured by Primix Corporation).

(1): First electron conductive filler E-9: 1.0 parts by mass (2): Polyol P-1: 90.0 parts by mass (3): Polyol P-3: 10.0 parts by mass (4): Dispersant D-1: 6.0 parts by mass Furthermore, the following materials (5), (6), (7), and (8) were added to the container, and the mixture was stirred and mixed at 1500 rpm for 5 minutes using HOMODISPER 2.5 type, thereby obtaining a polyol mixture.

(5): Foaming agent W: 1.5 parts by mass (6): Foam stabilizer S-1: 0.4 parts by mass (7): Catalyst C-1: 1.0 parts by mass (8): Catalyst C-2: 0.5 parts by mass To the above polyol mixture, 24.7 parts by mass of isocyanate compound (N-1) was added, thereby obtaining a conductive layer material. The thus obtained conductive layer forming material was molded similarly to the electrophotographic roller A-1 in Example 1, thereby forming an electrophotographic roller B-3 in Comparative Example 3. Also, the amount of first electron conductive filler to be incorporated was changed from that of the electrophotographic roller B-3 in Comparative Example 3, thereby obtaining an electrophotographic roller B-4 in Comparative Example 4.

Table 7 shows incorporated materials to form the conductive layers used in the electrophotographic rollers A-40 to A-54 and B-1 to B-4.

TABLE 7

| | Roller | First electron conductive filler | | Second electron conductive filler | | Dispersant | Polyol | | Isocyanate | Foaming agent | Foam stabilizer | Catalyst | |
|---|---|---|---|---|---|---|---|---|---|---|---|---|---|
| | No. | Type | Amount | Type | Amount | D-1 | P-1 | P-3 | N-1 | W | S-1 | C-1 | C-2 |
| Example 40 | A-40 | E-3 | 0.05 | — | 0 | — | 90 | 10 | 24.7 | 1.5 | 0.4 | 1 | 0.5 |
| Example 41 | A-41 | E-3 | 1 | — | 0 | — | 90 | 10 | 24.7 | 1.5 | 0.4 | 1 | 0.5 |
| Example 42 | A-42 | E-3 | 0.3 | — | 0 | — | 90 | 10 | 24.7 | 1.5 | 0.4 | 1 | 0.5 |
| Example 43 | A-43 | E-3 | 0.8 | — | 0 | — | 90 | 10 | 24.7 | 1.5 | 0.4 | 1 | 0.5 |
| Example 44 | A-44 | E-1 | 0.017 | E-3 | 0.003 | — | 90 | 10 | 24.7 | 1.5 | 0.4 | 1 | 0.5 |
| Example 45 | A-45 | E-1 | 0.167 | E-3 | 0.033 | — | 90 | 10 | 24.7 | 1.5 | 0.4 | 1 | 0.5 |
| Example 46 | A-46 | E-1 | 0.667 | E-3 | 0.133 | — | 90 | 10 | 24.7 | 1.5 | 0.4 | 1 | 0.5 |
| Example 47 | A-47 | E-1 | 0.006 | E-3 | 0.004 | — | 90 | 10 | 24.7 | 1.5 | 0.4 | 1 | 0.5 |
| Example 48 | A-48 | E-1 | 0.056 | E-3 | 0.013 | — | 90 | 10 | 24.7 | 1.5 | 0.4 | 1 | 0.5 |
| Example 49 | A-49 | E-1 | 0.222 | E-3 | 0.050 | — | 90 | 10 | 24.7 | 1.5 | 0.4 | 1 | 0.5 |
| Example 50 | A-50 | E-2 | 0.05 | — | 0 | — | 90 | 10 | 24.7 | 1.5 | 0.4 | 1 | 0.5 |
| Example 51 | A-51 | E-2 | 0.5 | — | 0 | — | 90 | 10 | 24.7 | 1.5 | 0.4 | 1 | 0.5 |
| Example 52 | A-52 | E-2 | 8 | — | 0 | — | 90 | 10 | 24.7 | 1.5 | 0.4 | 1 | 0.5 |
| Example 53 | A-53 | E-2 | 0.1 | E-5 | 1 | — | 90 | 10 | 24.7 | 1.5 | 0.4 | 1 | 0.5 |
| Example 54 | A-54 | E-2 | 0.5 | E-5 | 0.5 | — | 90 | 10 | 24.7 | 1.5 | 0.4 | 1 | 0.5 |
| Comparative Example 1 | B-1 | I-1 | 2 | — | 0 | — | 90 | 10 | 24.7 | 1.5 | 0.4 | 1 | 0.5 |
| Comparative Example 2 | B-2 | I-2 | 1 | — | 0 | — | 90 | 10 | 24.7 | 1.5 | 0.4 | 1 | 0.5 |
| Comparative Example 3 | B-3 | E-9 | 1 | — | 0 | 6 | 90 | 10 | 24.7 | 1.5 | 0.4 | 1 | 0.5 |
| Comparative Example 4 | B-4 | E-9 | 12 | — | 0 | 6 | 90 | 10 | 24.7 | 1.5 | 0.4 | 1 | 0.5 |

Table 8 shows physical properties and evaluation results of the electrophotographic rollers A-40 to A-54 and B-1 to B-4.

TABLE 8

| | Roller No. | max\|θ\| degrees | SPM hardness Mpa | Porosity % by volume | Resistance value Initial Ω | Resistance value after electric conduction Ω | Resistance change rate |
|---|---|---|---|---|---|---|---|
| Example 40 | A-40 | 10.0 | 1532 | 85 | 3.25E+09 | 1.03E+11 | 31.78 |
| Example 41 | A-41 | 9.5 | 1518 | 85 | 2.50E+09 | 7.36E+10 | 29.43 |
| Example 42 | A-42 | 9.0 | 1652 | 84 | 1.78E+09 | 4.83E+10 | 27.14 |
| Example 43 | A-43 | 8.0 | 1807 | 84 | 9.12E+08 | 2.08E+10 | 22.76 |
| Example 44 | A-44 | 2.5 | 1549 | 86 | 5.07E+09 | 2.04E+10 | 4.02 |
| Example 45 | A-45 | 2.2 | 1549 | 85 | 9.61E+08 | 3.19E+09 | 3.32 |
| Example 46 | A-46 | 2.1 | 1530 | 84 | 4.42E+08 | 1.37E+09 | 3.10 |
| Example 47 | A-47 | 4.8 | 1545 | 86 | 8.07E+09 | 8.56E+10 | 10.60 |
| Example 48 | A-48 | 4.5 | 1545 | 85 | 1.61E+09 | 1.55E+10 | 9.63 |
| Example 49 | A-49 | 4.3 | 1502 | 84 | 7.48E+08 | 6.73E+09 | 9.00 |
| Example 50 | A-50 | 1.9 | 1539 | 86 | 4.91E+09 | 1.31E+10 | 2.68 |
| Example 51 | A-51 | 1.5 | 1555 | 85 | 1.14E+09 | 2.16E+09 | 1.89 |
| Example 52 | A-52 | 1.4 | 1839 | 84 | 1.21E+08 | 2.08E+08 | 1.72 |
| Example 53 | A-53 | 1.8 | 2018 | 84 | 3.85E+09 | 9.52E+09 | 2.47 |
| Example 54 | A-54 | 1.5 | 1965 | 84 | 7.49E+08 | 1.42E+09 | 1.89 |
| Comparative Example 1 | B-1 | 34.0 | 1306 | 85 | 9.01E+08 | 9.33E+10 | 103.60 |
| Comparative Example 2 | B-2 | 31.0 | 1329 | 85 | 8.08E+08 | 7.81E+10 | 96.62 |
| Comparative Example 3 | B-3 | 20.0 | 2159 | 84 | 1.52E+09 | 1.37E+11 | 89.81 |
| Comparative Example 4 | B-4 | 16.0 | 2584 | 84 | 6.48E+08 | 4.16E+10 | 64.27 |

It was confirmed from the evaluation results of the examples that since absolute values of phase delays θ when an AC voltage with an inter-peak voltage of 50 V was applied in the frequency range of 0.1 to 10 Hz in the electrophotographic rollers according to the present disclosure were 10 degrees or less, the resistance change rates were low and electric conduction degradation was unlikely to occur even in a case in which a high voltage was applied over a very long period of time and idle rotation with electric conduction was performed.

Also, it was confirmed that the resistance change rates in the case in which the high voltage was applied over a very long period of time and idle rotation with electric conduction was performed were able to be further reduced when the absolute values of the phase delays θ were 5 degrees or less.

The electrophotographic rollers in Examples 1 to 19 were produced by comprising carbon nanotubes as conductive fillers and changing the amounts of incorporated carbon nanotubes, the types and the amounts of incorporated polyol and isocyanate (ratios between hydroxyl groups and isocyanate groups in polyol), and the amounts of added foaming agents. In all the electrophotographic rollers in Examples 1 to 19, absolute values of phase delays θ were 10 degrees or less, and electric conduction degradation was curbed.

The electrophotographic rollers in Examples 20 to 31, 38, and 39 were produced by changing the types and the amounts of incorporated electron conductive fillers, and combinations. In all the electrophotographic rollers in Examples 20 to 31, 38, and 39, absolute values of phase delays θ were 10 degrees or less, and electric conduction degradation was curbed. Particularly, it was confirmed that when the amounts of incorporated carbon nanotube were increased, the absolute values of the phase delays θ decreased, and it was possible to further curb electric conduction degradation.

The electrophotographic rollers in Examples 32 to 37 were produced by changing the amounts of incorporated nonionic surfactants (dispersants). In all the electrophotographic rollers in Examples 32 to 37, absolute values of phase delays θ were 10 degrees or less, and electric conduction degradation was curbed.

When the dispersants were used, the absolute values of the phase delays θ were less than 5 degrees, and electrophotographic rollers with further curbed electric conduction degradation were obtained. Furthermore, it was confirmed that when the amounts of incorporated nonionic surfactants were not less than three times the amounts of incorporated carbon nanotube, the absolute values of the phase delays θ were smaller, and the electric conduction degradation was further curbed.

On the other hand, the electrophotographic rollers in Comparative Examples 1 and 2 used ion conductive electron conductive fillers. Therefore, absolute values of phase delays θ exceeded 10 degrees, and resistance change rates were significantly high. In other words, it was confirmed that electric conduction degradation had occurred.

In the electrophotographic rollers in Comparative Examples 3 and 4, electron conductive fillers (carbon nanotubes) were dispersed using ionic surfactants. Therefore, absolute values of phase delays θ exceeded 10 degrees, and it was also confirmed that electric conduction degradation was significant.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-135887, filed Aug. 23, 2023, which is hereby incorporated by reference herein in its entirety.

What is claimed is:

1. A developer feed roller, comprising:

a substrate that has a conductive surface; and a foam conductive layer on the surface of the substrate, the conductive layer being a surface layer of the developer feed roller;

the conductive layer having a skeleton comprising a foamed polyurethane binder and an electron conductive filler in the polyurethane;

the conductive layer comprising at least one void, and at least a part of an inner wall of the void is configured of the skeleton, wherein when an electrode is brought into contact with an outer surface of the conductive layer and an AC voltage with an inter-peak voltage of 50 V is applied between the electrode and the surface of the substrate in a frequency range of 0.1 to 10 Hz, an absolute value of a phase delay θ of an AC impedance with respect to the AC voltage is 10 degrees or less, and an average elastic modulus measured using an SPM on a surface of the inner wall is 1300 to 2000 MPa.

2. The developer feed roller according to claim 1, wherein the absolute value of the phase delay θ is 5 degrees or less.

3. The developer feed roller according to claim 1, wherein a content of the electron conductive filler in the conductive layer is 0.001 to 5% by mass.

4. The developer feed roller according to claim 1, wherein the electron conductive filler comprises carbon nanotubes as a first electron conductive filler.

5. The developer feed roller according to claim 4, wherein a content of the carbon nanotubes in the conductive layer is 0.001 to 0.8% by mass.

6. The developer feed roller according to claim 4, wherein the electron conductive filler comprises a second electron conductive filler that is different from the first electron conductive filler, and the second electron conductive filler comprises at least one member selected from a group consisting of carbon black, graphite, fine metal particles and tin oxide.

7. The developer feed roller according to claim 6, wherein a content of the first electron conductive filler in the conductive layer is 0.01 to 0.8% by mass, and a content of the second electron conductive filler in the conductive layer is 0.001 to 1.0% by mass.

8. The developer feed roller according to claim 6, wherein a content of the first electron conductive filler in the conductive layer is 0.001 to 0.05% by mass, and a content of the second electron conductive filler in the conductive layer is 0.5 to 4.95% by mass.

9. The developer feed roller according to claim 1, wherein the conductive layer further comprises a nonionic surfactant.

10. The developer feed roller according to claim 9, wherein the nonionic surfactant comprises a polyalkylene glycol alkyl ether.

11. The developer feed roller according to claim 1, wherein the conductive layer has a porosity of 50 to 97% by volume.

12. The developer feed roller according to claim 1, wherein a porosity of the conductive layer is 70 to 90% by volume.

13. A developing apparatus, comprising:

a developing roller; and a developer feed roller that feeds a developer to the developing roller, wherein the developing apparatus is configured such that a voltage is able to be applied between the developing roller and the developer feed roller, and the developer feed roller is the roller according to claim 1.

14. An electrophotographic image forming apparatus comprising the developing apparatus according to claim 13.

15. A process cartridge that is detachably attachable from a main body of an electrophotographic image forming apparatus, the process cartridge comprising:

a contact member that is electrically connected to an electrical contact of the main body when the process cartridge is attached to the main body;

a developing roller; and a developer feed roller that feeds a developer to the developing roller, wherein the process cartridge is configured such that a voltage is able to be applied between the developing roller and the developer feed roller through electrical connection to the main body, and the developer feed roller is according to claim 1.

* * * * *